US011636590B2

(12) United States Patent
Kaethner et al.

(10) Patent No.: US 11,636,590 B2
(45) Date of Patent: Apr. 25, 2023

(54) PROVIDING A RESULT IMAGE DATA SET

(71) Applicant: Siemens Healthcare GmbH, Erlangen (DE)

(72) Inventors: Christian Kaethner, Forchheim (DE); Sai Gokul Hariharan, Forchheim (DE); Markus Kowarschik, Nuremberg (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 3 days.

(21) Appl. No.: 16/871,231

(22) Filed: May 11, 2020

(65) Prior Publication Data
US 2020/0364858 A1 Nov. 19, 2020

(30) Foreign Application Priority Data

May 17, 2019 (DE) .......................... 102019207238.0

(51) Int. Cl.
G06N 3/04 (2006.01)
G06T 7/00 (2017.01)
G06K 9/62 (2022.01)

(52) U.S. Cl.
CPC .......... G06T 7/0012 (2013.01); G06K 9/6267 (2013.01); G06N 3/0454 (2013.01); G06T 2207/10116 (2013.01); G06T 2207/20081 (2013.01); G06T 2207/20084 (2013.01)

(58) Field of Classification Search
CPC combination set(s) only.
See application file for complete search history.

(56) References Cited

U.S. PATENT DOCUMENTS 9,895,119 B2 * 2/2018 Langan .................. A61B 6/486
10,702,233 B2 * 7/2020 Pauly ..................... A61B 6/025
10,726,587 B2 * 7/2020 Zhao ..................... G06T 3/4076
(Continued)

FOREIGN PATENT DOCUMENTS

DE 10156215 A1 6/2003

OTHER PUBLICATIONS

Wolterink et al. "Generative Adversarial Networks for Noise Reduction in Low-Dose CT" May 26, 2017 (Year: 2017).*
(Continued)

Primary Examiner — Tsung Yin Tsai
(74) Attorney, Agent, or Firm — Harness, Dickey & Pierce, P.L.C.

(57) ABSTRACT

Some embodiments relate to solutions to providing a result image data set. At least one embodiment is based on an input image data set of a first examination volume being received. A result image parameter is received or determined. A result image data set of the first examination volume is determined by application of a trained generator function to input data. Input data is based on the input image data set and the result image parameter, and the result image parameter relates to a property of the result image data set. A parameter of the trained generator function is based on a GA algorithm (acronym for the English technical term "generative adversarial"). Finally, the result image data set is provided. Some embodiments relate to solutions for providing a trained generator function and/or a trained classifier function, in particular for use in solutions for providing a result image data set.

12 Claims, 9 Drawing Sheets

(56) References Cited

U.S. PATENT DOCUMENTS

| | | | |
|---|---|---|---|
| 10,925,568 B2* | 2/2021 | Lu | G06T 11/008 |
| 10,937,540 B2* | 3/2021 | Madani | G06N 3/0481 |
| 10,970,887 B2* | 4/2021 | Wang | G06N 3/084 |
| 2003/0092980 A1 | 5/2003 | Nitz | |
| 2016/0029987 A1* | 2/2016 | Langan | A61B 6/032 378/8 |
| 2017/0294034 A1* | 10/2017 | Zhou | G06T 11/008 |
| 2019/0035118 A1* | 1/2019 | Zhao | G06T 11/008 |
| 2019/0090834 A1* | 3/2019 | Pauly | G06T 3/0031 |
| 2019/0108904 A1 | 4/2019 | Zhou et al. | |
| 2019/0198156 A1* | 6/2019 | Madani | G06V 10/764 |
| 2019/0209867 A1* | 7/2019 | Sun | A61N 5/1067 |
| 2019/0251713 A1* | 8/2019 | Chen | A61B 6/482 |
| 2019/0325621 A1* | 10/2019 | Wang | A61B 5/00 |
| 2020/0118306 A1* | 4/2020 | Ye | G06T 5/002 |
| 2020/0349449 A1* | 11/2020 | Wang | G06T 5/50 |

OTHER PUBLICATIONS

Wolterink et al., "Deep MR to CT synthesis using unpaired data", International Workshop on Simulation and Synthesis in Medical Imaging. Springer, Cham, 3. Aug. 2017.; 2017.

Zhu et al., "Unpaired Image-to-Image Translation using Cycle-Consistent Adversarial Networks", 2017; pp. 2223-2232; 2017.

Hariharan et al.,2018. Simulation of Realistic Low Dose Fluoroscopic Images from their High Dose Counterparts. In Bildverarbeitung für die Medizin 2018 (pp. 80-85). Springer Vieweg, Berlin, Heidelberg.; 2018.

Choi, et al., "StarGAN: Unified Generative Adversarial Networks for Multi-Domain Image-to-Image Translation". arXiv preprint arXiv:1711.09020., Nov. 24, 2017; 2017.

Goodfellow, et al. "Generative adversarial nets" Advances in Neural Information Processing Systems, arXiv:1406.2661; 2014.

Yang et al. "Noise variance analysis using a flat panel x?ray detector: A method for additive noise assessment with application to breast CT applications", Medical Physics, vol. 37, No. 7, Jul. 2010, pp. 3527-3537.; 2010.

Yi et al., 2017. "Sharpness-aware Low dose CT denoising using conditional generative adversarial network". arXiv preprint arXiv:1708.06453., Oct. 19, 2017; 2017.

De Vos et al., "End-to-end unsupervised deformable image registration with a convolutional neural network", Deep Learning in Medical Image Analysis and Multimodal Learning for Clinical Decision Support. Springer, Cham, (2017); 2017.

Yang, et al., "Low dose CT image denoising using a generative adversarial network with Wasserstein distance and perceptual loss". IEEE Transactions on Medical Imaging., vol. 37, No. 6, Jun. 2018; 2018.

Wolterink et al., 2017. "Generative adversarial networks for noise reduction in low-dose CT". IEEE transactions on medical imaging, 36, No. 12, Dec. 2017), pp. 2536-2545.; 2017.

Costa, et al., "End-to-end adversarial retinal image synthesis." IEEE transactions on medical imaging, vol. 37, No. 3, Mar. 2018: pp. 781-791.; 2018.

Wikipedia: "Generative Adversarial Networks"; URL: https://de.wikipedia.org/w/index.php?title=Generative_Adversarial_Networks &oldid=186990065 ; Stand Mar. 27, 2019 [retrieved on Apr. 6, 2020].

Wikipedia: "Bedingte Anweisung und Verzweigung"; URL:https://de.wikipedia.org/w/index/.php?title=Bedingte_Anweisung_und_Verzweigung&oldid=185434103 ; Stand Feb. 6, 2019 [retrieved on Apr. 9, 2019].

Nie, D. et al.: "Medical Image Synthesis with Context-Aware Generative Adversarial Networks" 2016.

German Office Action dated Apr. 17, 2020.

Bashkirova, D. et al: "Unsupervised Video-to-Video-Translation"; Preprint 1806.03698v1 auf arxiv.org; Jun. 10, 2018; 2018.

Kang, E. et al: "Wavelet Domain Residual Network (WaveResNet) for LowDose-X-Ray CT Reconstruction"; Preprint 1703.01383v1 aufarxiv.org; Mar. 4, 2017; pp. 1-5; 2017.

Yi, Xin et al: "Generative Adversaria! Network in Medical Imaging: A Review"; Preprint 1809.07294v2 auf arxiv.org; Mar. 5, 2019; pp. 1-19; 2019.

* cited by examiner

PROVIDING A RESULT IMAGE DATA SET

PRIORITY STATEMENT

The present application hereby claims priority under 35 U.S.C. § 119 to German patent application number DE 102019207238.0 filed May 17, 2019, the entire contents of which are hereby incorporated herein by reference.

FIELD

Embodiments of the invention generally relate to a computer implemented system/method for providing a result image data set.

BACKGROUND

In medical practice, X-ray devices are often used for monitoring (in particular minimally invasive) surgical procedures, sometimes particular procedures are only possible by way of X-ray monitoring, for example the implantation of an aortic valve via a catheter.

The advantages of such a procedure monitored by X-ray must be weighed up here against the radiation exposure due to the absorbed X-ray dose. Since, typically, the reduction in the X-ray dose is also accompanied by a reduction in the image quality or an increase in the signal-to-noise ratio, a compromise frequently has to be found between good image quality and low X-ray dose.

If the signal-to-noise ratio is too high, then this can in particular also lead to low image quality in the case of digital subtraction angiography (DSA for short). In particular, the necessary registering of mask image data set and fill image data set is not possible, or the noise can lead in registering to artifacts.

It is known to increase the image quality by way of different noise suppression methods. These methods can change the image impression and/or lead to artifacts, however. If the noise suppression is applied to an excessive extent, then this can lead, for example, to an animated-type image impression.

Furthermore, it is known to optimize, by way of optimized protocols (in other words, by an optimized selection of the parameter of the X-ray device) to optimize the signal-to-noise ratio.

SUMMARY

The inventors have discovered that selection of the protocols can also change the image impression, however (for example the values of the image pixels can differ for the same imaged structure in the case of different image recording values). The inventors have discovered that this presents a problem, in particular, when the image data is to be processed further by trained algorithms, in particular when the algorithms used for training were received only by way of a limited number of protocols or a limited number of X-ray devices.

At least one embodiment of the invention provides a possibility of increasing the signal-to-noise ratio without changing the image impression.

Embodiments are directed to a computer-implemented method for providing a result image data set; a computer-implemented method for providing a trained generator function; a provision system; an X-ray device; a computer program product and a computer-readable storage medium. Advantageous developments are described in the claims and in the following description.

Hereinafter, the embodiments will be described in relation to both the devices and the methods. Features, advantages or alternative embodiments mentioned here should likewise also be transferred to the other subject matters and vice versa. In other words, the concrete embodiments (which are geared, for example, toward a device) can also be developed by the features, which are described or claimed in connection with a method. The corresponding functional features of the method are formed by corresponding concrete modules.

Furthermore, the inventive embodiments are described both in relation to methods and devices for providing result image data sets and in relation to methods and devices for providing trained generator functions and/or trained classifier functions. Here, features and alternative embodiments of data structures and/or functions in the case of methods and devices for providing result image data sets can be transferred to analogous data structures and/or functions in the case of methods and devices for providing trained generator functions and/or trained classifier functions. Analogous data structures can be identified here in particular by the use of the prefix "training". Furthermore, the trained generator functions and/or trained classifier functions used in methods and devices for providing result image data sets can have been adapted and/or provided in particular by methods and devices for providing trained generator functions and/or trained classifier functions.

The invention relates in a first embodiment to a computer-implemented method for providing a result image data set. The method is based on an input image data set of a first examination volume being received, in particular via an interface. Furthermore, a result image parameter is received or determined, in particular via the interface or an arithmetic unit. Furthermore, a result image data set of the first examination volume is determined by application of a trained generator function to input data, in particular via the arithmetic unit. Here, the input data is based on the input image data set and the result image parameter, and the result image parameter relates to a property of the result image data set. Furthermore, a parameter of the trained generator function is based on a GA algorithm (acronym for the technical term "generative adversarial"). Furthermore, the result image data set is provided, in particular via the interface. The provision of the result image data set can comprise, in particular, display, transfer and/or storage of the result image data set.

The invention relates in a second embodiment to a method for providing a trained generator function and/or a trained classifier function. Here, an input image data set and a comparison image data set of a first examination volume are received, in particular via a training interface. Furthermore, a result image parameter is received, similarly in particular via the interface, wherein the result image parameter relates to a property of the comparison image data set.

The invention relates in a third embodiment to a provision system for providing a result image data set, comprising an interface and an arithmetic unit, wherein the interface is designed for receiving an input image data set of a first examination volume,
wherein the interface and/or the arithmetic unit are designed for receiving or determining a result image parameter,
wherein the arithmetic unit is also designed for determining a result image data set of the first examination volume by application of a trained generator function to input data, wherein the input data is based on the input image data set and the result image parameter, wherein the result image parameter relates to a property of the result image data set, and wherein a parameter of the trained generator function is based on a GA algorithm, and wherein the interface is also designed for providing the result image data set.

The invention relates in a fourth embodiment to an X-ray device, comprising an X-ray source and an X-ray detector, further comprising a provision system as claimed in the third embodiment of the invention. An X-ray device can be, in particular, a C-arm X-ray device or a computer tomograph.

The invention relates in a possible fifth embodiment to a training system for providing a trained generator function and/or a trained classifier function, comprising a training interface and a training arithmetic unit,
  wherein the training interface is designed for receiving an input image data set and a comparison image data set of a first examination volume,
  wherein the training interface is also designed for receiving a result image parameter, wherein the result image parameter relates to a property of the comparison image data set,
  wherein the training arithmetic unit is designed for determining a result image data set of the first examination volume by application of a trained generator function to input data, wherein the input data is based on the input image data set and the result image parameter,
  wherein the training arithmetic unit is also designed for determining a result classifier and a comparison classifier by application of a trained classifier function to the result image data set and the comparison image data set,
  wherein the training arithmetic unit is also designed for adjusting a parameter of the trained generator function and/or the trained classifier function based on the result classifier and the comparison classifier,
  wherein the training interface is also designed for providing the trained generator function and/or the trained classifier function.

A training system can be designed, in particular, to carry out the above-described inventive method for providing a trained generator function and/or a trained classifier function. The training system is designed to carry out this method and its embodiments in that the training interface and the training arithmetic unit are designed to carry out the corresponding method steps.

The invention relates in a sixth embodiment to a computer program product having a computer program, which can be loaded directly into a memory of a provision system, with program segments in order to carry out all steps of the method for providing a result image data set and its embodiments when the program segments are run by the provision system; and/or which can be loaded directly into a training memory of a training system, with program segments in order to carry all steps of the method for providing a trained generator function and/or a trained classifier function and its embodiments when the program segments are run by the training system.

In particular, an embodiment of the invention relates to a computer program product having a computer program, which can be loaded directly into a memory of a provision system, with program segments in order to carry out all steps of the method for providing a result image data set and its embodiments when the program segments are run by the provision system.

In particular, an embodiment of the invention relates to a computer program product having a computer program, which can be loaded directly into a training memory of a training system, with program segments in order to carry out all steps of the method for providing a trained generator function and/or a trained classifier function and its embodiments when the program segments are run by the training system.

The invention relates in a seventh embodiment to a computer-readable storage medium on which program segments, which can be read and run by a provision system, are stored in order to carry out all steps of the method for providing a result image data set and its embodiments when the program segments are run by the provision system; and/or on which program segments, which can be read and run by a training system, are stored in order to carry out all steps of the method for providing a trained generator function and or a trained classifier function and its embodiments when the program segments are run by the training system.

In particular, an embodiment of the invention relates to a computer-readable storage medium on which program segments, which can be read and run by a provision system in order to carry out all steps of the method for providing a result image data set and its embodiments when the program segments are run by the provision system.

In particular, an embodiment of the invention relates to a computer-readable storage medium on which program segments, which can be read and run by a training system, are stored in order to carry out all steps of the method for providing a trained generator function and/or a trained classifier function and its embodiments when the program segments are run by the training system.

The invention relates in an eighth embodiment to a computer program or a computer-readable storage medium, comprising a trained generator function and/or a trained classifier function, provided by a method for providing a trained generator function and/or a trained classifier function.

An implementation largely in terms of software has the advantage that even previously used provision systems and training systems can be easily retrofitted by way of a software update in order to operate inventively. Apart from the computer program, a computer program product of this kind can optionally comprise additional components, such as, for example documentation and/or additional components, also hardware components, such as, for example hardware keys (dongles, etc.) for using the software.

BRIEF DESCRIPTION OF THE DRAWINGS

The above-described properties, features and advantages of this invention and the manner in which these are achieved will become clearer and more comprehensible in conjunction with the following description of the example embodiments, which are explained in more detail in conjunction with the drawings. This description does not restrict the invention to these example embodiments. Identical components are provided with identical reference numerals in the various figures. As a rule, the figures are not to scale. In the drawings.

DETAILED DESCRIPTION OF THE EXAMPLE EMBODIMENTS

Figure 1:
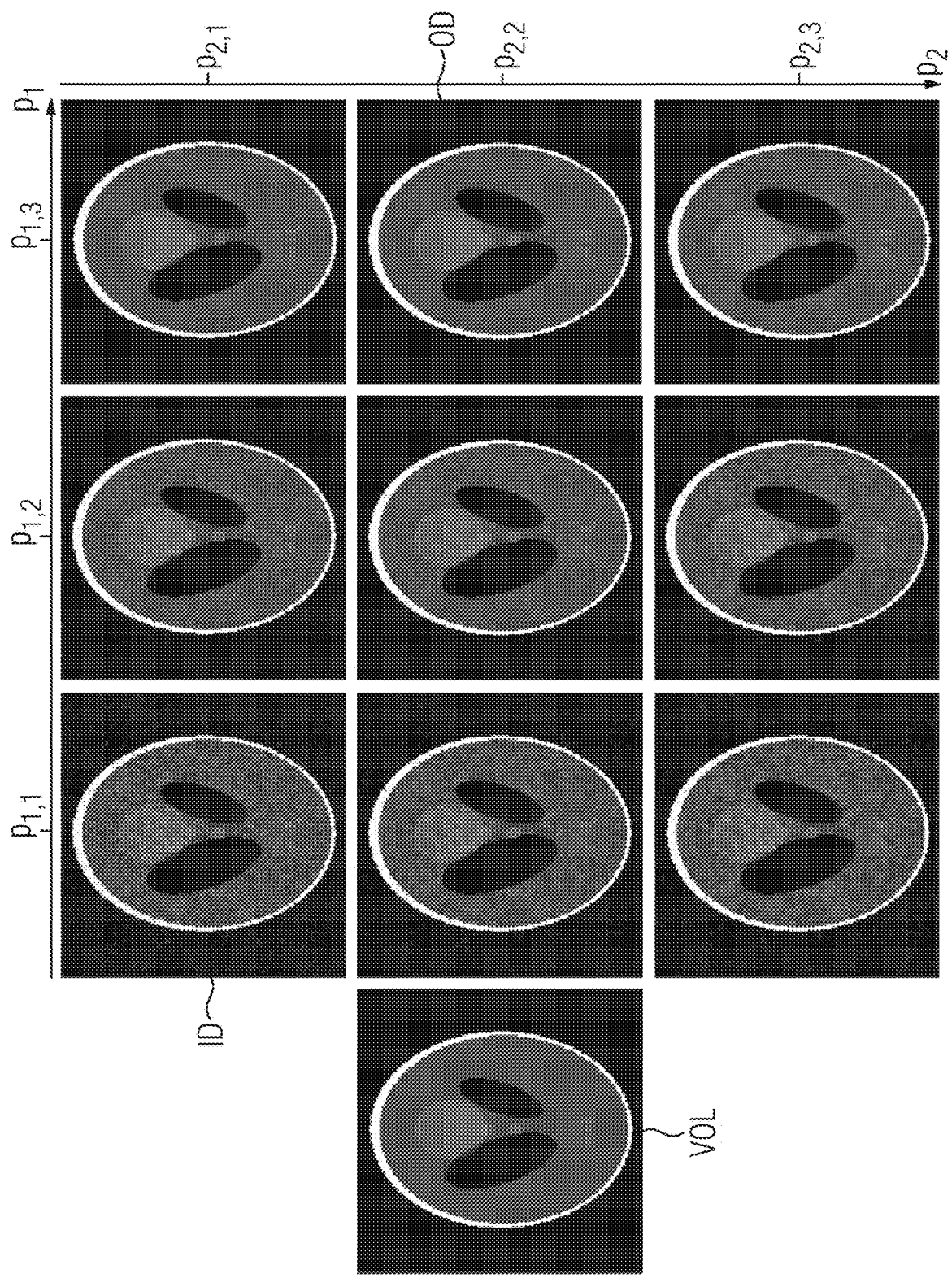
FIG. 1 shows an examination volume and various image data sets of the examination volume.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention relates in a first embodiment to a computer-implemented method for providing a result image data set. The method is based on an input image data set of a first examination volume being received, in particular via an interface. Furthermore, a result image parameter is received or determined, in particular via the interface or an arithmetic unit. Furthermore, a result image data set of the first examination volume is determined by application of a trained generator function to input data, in particular via the arithmetic unit. Here, the input data is based on the input image data set and the result image parameter, and the result image parameter relates to a property of the result image data set. Furthermore, a parameter of the trained generator function is based on a GA algorithm (acronym for the technical term "generative adversarial"). Furthermore, the result image data set is provided, in particular via the interface. The provision of the result image data set can comprise, in particular, display, transfer and/or storage of the result image data set.

An image data set comprises at least one image, an image data set can also comprise further data, in particular metadata. An image data set can, in particular, be identical to the image. An image data set can, in particular, be the result of an imaging medical examination, in particular the result of an imaging medical X-ray examination. In this case the image data set can, in particular, also be referred to as an X-ray image data set.

A two-dimensional image data set comprises at least one two-dimensional image, in particular a two-dimensional image data set does not comprise a further image having a different dimensionality. A three-dimensional image data set comprises at least one three-dimensional image, in particular a three-dimensional image data set does not comprise a further image having a different dimensionality. A four-dimensional image data set comprises at least one four-dimensional image, in particular a four-dimensional image data set does not comprise a further image having a different dimensionality. A two-dimensional image data set can be identical, in particular, to a two-dimensional image. A three-dimensional image data set can be identical, in particular, to a three-dimensional image. A four-dimensional image data set can be identical, in particular, to a four-dimensional image.

Metadata is in this case information about the imaging examination, which is the basis for the image data set, which is not images or image data, for example patient data or data about the protocol used.

An image data set comprises a plurality of pixels or voxels. Here, the terms pixel and voxel are used synonymously, therefore in particular do not allow a conclusion to be drawn about a dimensionality. An intensity value, which preferably corresponds to an X-ray absorption value, is associated with each of the pixels or voxels.

The input image data set is, in particular, an image data set. The result image data set is, in particular, an image data set. The input image data set and the result image data set have, in particular, the same dimensionality.

An image data set can, in particular, be referred to as a real image data set if the image data set is the direct result of an imaging examination or was generated directly from the raw data generated by the imaging examination. An image data set can be referred to, in particular, as a synthetic image data set or as a virtual image data set if it is not a real image data set, in particular if it is a result of the application of a trained generator function. The input image data set is, in particular, a real image data set, the result image data set is, in particular, a virtual image data set.

An image parameter relates, in particular, to a parameter of an image data set (for example brightness, contrast, sharpness, signal-to-noise ratio) or a parameter of the recording of an image data set or a parameter of an image recording device in the recording of the image data set (for example exposure time, size of the aperture, in particular in the case of X-ray image data sets or X-ray devices also the X-ray voltage, the X-ray current, the X-ray dose, a designation of the X-ray source and/or a designation of the X-ray detector. The result image parameter is, in particular, an image parameter.

A real image parameter relates, in particular, to a real image data set. A synthetic image parameter relates, in particular, to a synthetic image data set. A synthetic image parameter can also relate to a parameter of an image recording device, in this case it relates to a parameter of the image recording device, which would be necessary or would have to be used in order to record a real image data set comparable with the synthetic image data set, in particular to record a real image data set identical to the synthetic image data set.

A trained function is in particular a function, which maps input data on output data, with the output data also depending on at least one function parameter of the function, and wherein the function parameter can be adjusted by supervised learning, by semi-supervised learning and/or by unsupervised learning. The input data and/or the output data can comprise here, in particular, at least one image data set each.

In particular, a trained generator function is a trained function, and a trained classifier function is a trained function. In the case of a trained function, one of its parameters does not necessarily have to have been adjusted already, therefore the term "trained function" can also be replaced by "trainable function", in particular the term "trained generator function" can be replaced by "trainable generator function" and/or the term "trained classifier function" by "trainable classifier function". In particular, the terms "trained generator function" and "generator function" can be used as synonyms, and/or the terms "trained classifier function" and "classifier function" can be used as synonyms.

In the case of a trained generator function, in particular the output data comprises at least one image data set, the input data can optionally comprise an image data set. In the case of a trained classifier function, in particular the input data comprises at least one image data set, the output data comprises a classifier and/or one or more probability value(s). The classifier corresponds here in particular to an estimated value for an image parameter, and the probability value corresponds, in particular, to the probability that the image data set of the input data is a real image data set or a synthetic image data set. The designation "classifier function" can therefore be replaced in particular by the designation "discriminator function" and/or by the designation "discriminator and classifier function" or by the designation "classifier and discriminator function".

A GA algorithm ("GA" is an acronym for "generative adversarial"), comprises a generator function and a classifier function. Here, the generator function generates synthetic data (another term is "virtual data"), and the classifier function distinguishes between synthetic and real data. In particular, training of the generator function and/or the classifier function means that, on the one hand, the generator function generates such synthetic data, which is erroneously classified by the classifier function as real, on the other hand, the classifier function can distinguish optimally between real data and synthetic data. Game-theoretically, a GA algorithm can also be interpreted as a zero sum game. Training of the generator function and/or the classifier function is based, in particular, on the minimization or a cost function in each case.

If the generator function and the classifier function are given by a network, in particular by an artificial neural network, then the GA algorithm is also referred to as the GA-network (also "GAN", acronym for "generative adversarial network"). These are known, in particular, from the document Ian J. Goodfellow, "Generative Adversarial Networks", arxiv 1406.2661 (2014), the entire contents of which are hereby incorporated herein by reference. The cost function can be minimized, in particular, by way of back propagation.

A parameter of the trained generator function is based in particular on a GA algorithm or on a GA network in such a way that the parameter of the trained generator function is identical to a parameter of the generator function of the GA algorithm or of the GA network. In particular, a parameter of the trained generator function is based on a GA algorithm or a GA network in such a way that the trained generator function is identical to the generator function of the GA algorithm or of the GA network.

The inventors have recognized that through the use of a trained generator function, wherein a parameter of the trained generator function is based on a GA algorithm, result image data sets can be generated, which have a predefined image impression since through the use of a classifier function in the GA algorithm, the generator function is trained such that the specified image impression is achieved. The image impression of the result image data set can be specified here in particular by the result image parameter.

According to a further embodiment of the invention, the method also comprises receiving or determining an input image parameter, wherein the input image parameter relates to a property of the result image data set, and wherein the input data is also based on the input image parameter. Receiving or determining the input image parameter is carried out, in particular, via the interface or the arithmetic unit. An input image parameter is, in particular, an image parameter.

The input image parameter can be contained, in particular, in the input image data set, for example in the metadata of the result image data set. In particular, the input image data set can be also be mathematically ascertained or determined from the input image data set as well.

The inventors have recognized that through the use of the input image parameter in the input data of the trained generator function, this data does not have to be derived by the trained generator function from the input image data set. As a result, firstly, the trained generator function can be trained more efficiently (since with a predefined number of parameters less output data has to be calculated, and therefore less training data has to be used), secondly, the method is less error-prone, since in particular an exact and not a potentially defective value of the input image parameter can be used.

According to a further embodiment of the invention, the input image data set is an X-ray image data set of the first examination volume, and the result parameter relates to one or more of the following properties of the result image data set: X-ray dose of the result image data set, noise level of the result image data set, X-ray source and/or X-ray detector corresponding to the result image data set. Optionally, in particular if an input image parameter is received or determined, the input image data set relates to one or more of the following properties of the result image data set: X-ray dose of the result image data set, noise level of the input image data set, X-ray source and/or X-ray detector corresponding to the result image data set.

The X-ray dose of the input image data set corresponds, in particular, to the X-ray dose used in recording the input image data set or the X-ray dose absorbed by the first examination volume in recording the result image data set. The X-ray dose of the result image data set corresponds in particular to the X-ray dose to be used in a hypothetical recording of the result image data set or the hypothetical X-ray dose absorbed in a hypothetical recording of the first examination volume. It should be noted here that the result image data set does not originate from an actual recording of the first examination volume but was determined on the basis of the input image data set. Therefore, no real recording is associated with the result image data set. The X-ray dose is therefore the X-ray dose, which would be necessary to generate the corresponding image impression of the result image data set.

The noise level of an image data set corresponds, in particular, to the signal-to-noise ratio of the image data set.

The X-ray source and/or X-ray detector corresponding to the input image data set is, in particular, the X-ray source and/or X-ray detector, which was used in recording the input image data set. The X-ray source and/or X-ray detector corresponding to the result image data set is in particular the X-ray source and/or X-ray detector, which would be used in a hypothetical recording of the result image data set. It should be noted here that the result image data set does not originate from an actual recording of the first examination volume but was determined on the basis of the input image data set. Therefore, no real recording is associated with the result image data set. The X-ray source and/or X-ray detector corresponding to the result image data set is therefore the X-ray source and/or X-ray detector, which would be necessary to generate the corresponding image impression of the result image data set.

If the result image parameter comprises the X-ray dose of the result image data set, then, in particular, the optional input image parameter also comprises the X-ray dose of the result image data set. If the result image parameter comprises the noise level of the result image data set, then, in particular, the optional input image parameter also comprises the noise level of the input image data set. If the result image parameter comprises X-ray source and/or X-ray detector corresponding to the result image data set, then, in particular, the optional input image parameter also comprises the X-ray source and/or X-ray detector corresponding to the input image data set.

The inventors have recognized that through the use of the X-ray dose or of the noise level as the result image parameter, the actual X-ray dose used can be kept small, but, at the same time, an X-ray image data set with a low noise level can be provided. Through the use of the X-ray source and/or of the X-ray detector as the result image parameter, image impressions can be generated which correspond to a recording by a further X-ray device different from the X-ray device. As a result, in particular image processing routines can be used, which are matched to recordings of the further X-ray device.

According to one further possible embodiment, the invention is also based on a comparison image data set of a second examination volume being received in particular via the interface, wherein the first examination volume and the second examination volume overlap and/or are identical. Furthermore, a comparison image parameter is determined in particular via the arithmetic unit, wherein the comparison image parameter relates to a property of the comparison image data set. Furthermore, the input image parameter and the comparison image parameter are compared, and the result image data set is determined if the comparison image parameter differs from the input image parameter. Here, the result image parameter used corresponds to the comparison image parameter.

The comparison image data set is in particular an image data set, the comparison image parameter is in particular an image parameter. The comparison image parameter relates, in particular, to one or more of the following properties of the comparison image parameter: X-ray dose of the comparison image parameter, noise level of the comparison image parameter, X-ray source and/or X-ray detector corresponding to the comparison image parameter. The X-ray dose of the comparison image data set corresponds, in particular, to the X-ray dose used in recording the comparison image data set or the X-ray dose absorbed by the second examination volume in recording the comparison image data set. The X-ray source and/or X-ray detector corresponding to the comparison image data set is, in particular, the X-ray source and/or X-ray detector, which was used in recording the comparison image data set.

The inventors have recognized that by way of a comparison with a given comparison image data set, a plurality of image data with an identical or similar image impression can be generated, and, at the same time, a result image data set only has to be determined if this is necessary owing to a difference in the input image parameter and the comparison image parameter. Unnecessary computing operations can be avoided thereby. This is advantageous, in particular, if the described method is to be carried out on input image data sets in an image stream (for example in the case of X-ray monitoring of a surgical procedure).

According to a further embodiment, the invention is also based on a comparison image data set of a second examination volume being received in particular via the interface, wherein the first examination volume and the second examination volume overlap and/or are identical. Furthermore, in particular via the arithmetic unit, a comparison image parameter is determined by application of a trained classifier function to the comparison image data set, wherein the comparison image parameter relates to a property of the comparison image data set, and wherein a parameter of the trained classifier function is based on the GA algorithm. Furthermore, the input image parameter and the comparison image parameter are compared, and the result image data set is determined if the comparison image parameter differs from the input image parameter. Here, the result image parameter used corresponds to the comparison image parameter. In particular, the input image parameter can also be determined by application of the trained classifier function to the input image data set.

The inventors have recognized that through the use of the trained classifier function, in particular also those comparison image parameters or input image parameters can be used which are not contained in the comparison image data set or in the input image data set itself or which cannot be derived by a simple calculation from the comparison image data set or the input image data set.

According to a further embodiment of the invention, the method also comprises the adjustment of an imaging parameter of an imaging unit based on the comparison of the input image parameter and of the comparison image parameter. The imaging unit can in particular be an X-ray device; in the case of an X-ray device, the imaging parameter can be, in particular, the X-ray voltage, the X-ray current and/or an exposure time.

Adjustment of the imaging parameter can be, in particular, a regulation of the imaging parameter to reduce the difference between the input image parameter and the comparison image parameter.

The inventors have recognized that the image impression of successive image data sets can be aligned by the adjustment or regulation of the imaging parameter. In particular, the application of the described method can be improved hereby for subsequent image data sets of the imaging unit since artifacts can be reduced if the input image parameter and the result image parameter are similar.

According to a further embodiment of the invention, the method also comprises determining an input frequency data set based on the input image data set, wherein the input frequency data set is a representation of the input image data set in the frequency space, wherein the input data is based on the input frequency data set, wherein the application of the trained generator function to the input data generates a result frequency data set, wherein the result frequency data set is a representation of the result image data set in the frequency space. The input frequency data set is determined here in particular via the arithmetic unit.

In particular, the input frequency data set is a Fourier transform of the result image data set and the result frequency data set is a Fourier transform of the result image data set. In particular, the input frequency data set can also be a wavelet decomposition of the input image data set, and the result frequency data set can be a wavelet decomposition of the result image data set.

In particular, the input data can be based on the input frequency data set in such a way that the input data comprises the input frequency data set below a predetermined limit frequency (low-frequency fractions), and that the input data comprises the input frequency data set above the predetermined limit frequency (high-frequency fraction).

The inventors have recognized that due to the application of the method in the frequency space instead of in the real space, the edges (which correspond to high-frequency fractions) can be obtained better in the image data sets, and consequently, the structural information in the result image data set can be obtained.

According to a further embodiment of the invention, the result image parameter is matched to a trained image processing function. The result image parameter is, in particular, matched to the trained image processing function if the trained image processing function is designed to process image data sets with properties described by the result image parameter.

The image processing function can be, in particular, a trained function, in particular an artificial neural network. The trained image processing function is designed in particular to process image data sets with properties described by the result image parameter if the training image data sets used for training the image processing function or a subset of the training image data sets have the properties described by the result image parameter.

The inventors have recognized that due to the matching of the result image parameter to the trained image processing function, this function can also be applied to image data, which differs from the training image data sets used for training. In particular, the trained image processing function can be trained on the basis of a lower number of training image data sets therefore, and thereby more efficiently, and the application of the trained image processing function is less error-prone.

According to a further embodiment of the invention, the method also comprises receiving a mask image data set of a third examination volume, wherein the first examination volume and the third examination volume overlap and/or are identical, and wherein the input data is also based on the mask image data set. Receiving occurs, in particular, via the interface. In particular, in this embodiment the input image data set is a fill image data set, and the result image data set is a differential image data set.

A mask image data set is in particular an image data set of an examination volume, which at the instant of recording of the mask image data set does not comprise any contrast medium. In particular, a mask image data set is an X-ray image data set. A fill image data set is, in particular, an image data set of an examination volume, which, at the instant of recording the fill data set, comprises contrast medium. A differential image data set is, in particular, an image data set of an examination volume, which represents the difference between a fill data set and a mask image data set.

The inventors have recognized that through the use of the trained generator function, a result image data set or a differential image data set, in particular with a lower signal-to-noise ratio, can be generated. Furthermore, through the use of the trained generator function, differences in the imaging geometry between fill image data set and mask image data set can be compensated also, without having to perform resource-intensive registering between the images.

According to a further embodiment of the invention, the parameter of the trained generator function is based on a cyclical consistency cost function and/or on an information loss-cost function. An alternative term for cyclical consistency cost function is reconstruction cost function. According to a further possible embodiment of the invention, the parameter of the trained generator function is based on an adversarial cost function and/or on a classification cost function. According to a further possible embodiment of the invention, a parameter of the trained classifier function is based on an adversarial cost function and/or on a classification cost function.

A parameter of a trained function is based, in particular, on a cost function if the parameter was adjusted or changed in order to minimize or maximize this cost function.

A cyclical consistency cost function is, in particular, a cost function based on a comparison of a two-time application of the trained generator function with the input data. In particular, the cyclical consistency cost function is based on a standard of the difference of the input image data set and the application of the trained generator function to input data comprising the result image data set and the input image parameter. The standard can be, in particular, a 1-standard or a 2-standard, the standard can be evaluated, in particular, pixel-by-pixel and/or voxel-by-voxel.

Use of a cyclical consistency cost function means that the two-time application of the trained generator function (with appropriate image parameters in each case) acts as an identity image. This means that the trained generator function can generate synthetic image data sets for given image parameters particularly well.

An information loss-cost function is, in particular, a cost function based on noise averaging, in particular the information loss-cost function is based on averaging of noise in sub-sections of different size of the result image data set OD and/or of the result image data set.

The use of an information loss-cost function means that the following can be exploited: that real noise has a mean of zero, or that the noise-averaged intensity value of pixels and/or voxels in a region of an image data set corresponds to the mean intensity value. Using this cost function means, in particular, that the low-frequency and the high-frequency fractions of the input image data set are obtained in the result image data set.

An adversarial cost function is, in particular, a cost function, which measures the quality of the difference in the trained classifier function between real and synthetic data. An adversarial cost function for the trained generator function can, in particular, have a first value if the result image data set is identified by the trained classifier function as a synthetic image data set, and has a second value if the result image data set is identified by the trained classifier function as a real image data set, wherein the first value is greater than the second value. An adversarial cost function for the trained classifier function can have, in particular, a third value if the result image data set is identified by the trained classifier function as a synthetic image data set, and has a fourth value if the result image data set is identified by the trained classifier function as a real image data set, wherein the fourth value is greater than the third value. An adversarial cost function for the trained classifier function can in particular have a fifth value if a real comparison image data set is identified by the trained classifier function as a synthetic image data set, and has a sixth value if the real comparison image data set is identified by the trained classifier function as the real image data set, wherein the fifth value is greater than the sixth value.

Through the use of an adversarial cost function, the trained generator function and the trained classifier function can be trained in particular such that the trained generator function generates result image data sets, which the trained classifier function can barely distinguish from real image data sets, and that the trained classifier function can, at the same time, distinguish optimally accurately between real and synthetic image data sets.

A classification cost function is in particular a cost function, which is based on a comparison (in particular a difference) of the result image parameter and a calculated image parameter of the result image data set. In particular, the classification cost function assumes its optimum (in particular its minimum) when the result image parameter and the calculated image parameter of the result image data set match.

Through the use of a classification cost function, for the trained generator function it can be achieved that this generates result image data sets which are described optimally accurately by the result image parameter. For the trained classifier function it can be achieved that the image parameter determined by the trained classifier function optimally matches the actual image parameter.

According to a further possible embodiment of the invention, the trained generator function and/or the trained classifier function comprise a convolutional layer). According to a further possible embodiment of the invention, the trained generator function and/or the trained classifier function comprise a deconvolutional layer). According to a further possible embodiment of the invention, the trained generator function and/or the trained classifier function comprise a residual block.

A convolutional layer reproduces here, in particular, the mathematical operation of a convolution having one or more convolutional core(s), with the elements of the convolutional core corresponding to the weights of the neural network. A deconvolutional layer reproduces here, in particular, the mathematical operation of a deconvolution having one or more convolutional core(s). In a residual block a node layer of the neural network is connected not just to the directly following layer but also to one of the further following layers.

The inventors have recognized that convolutional layers are particularly suitable for identifying and further-processing features of image data sets. In particular, different features of the processed image data sets (for example edges or gradients) can be analyzed by different convolutional cores. In particular, specified features (for example edges or gradients) can be converted back into associated image data sets by deconvolutional layers. In particular, a suitable combination of convolutional layers and deconvolutional layers can act as autoencoders. Furthermore, the inventors have identified that through the use of residual blocks, the layers close to the input layers of the neural network can be trained better, and problems with disappearing gradients can be solved.

According to a further embodiment of the invention, the input image data set comprises a temporal sequence of input image data of the first examination volume, and wherein the result image data set comprises a temporal sequence of result image data of the first examination volume.

The inventors have recognized that, in particular, the image noise in temporally independent recordings is also statistically independent in a good approximation.

Consequently, through the use of a temporal sequence of input image data as input data of the trained generator function, a result image data set having the predefined result image parameter can be generated particularly well. This also applies if the plurality of result image data has different image geometry (for example, recordings were made in respect of different projection directions).

According to a further embodiment of the invention, the trained generator function and/or the trained classifier function was provided by a method for providing a trained generator function and/or a trained classifier function according to the invention, in particular according to the second embodiment of the invention.

The invention relates in a second embodiment to a method for providing a trained generator function and/or a trained classifier function. Here, an input image data set and a comparison image data set of a first examination volume are received, in particular via a training interface. Furthermore, a result image parameter is received, similarly in particular via the interface, wherein the result image parameter relates to a property of the comparison image data set.

The method also comprises determining a result image data set of the first examination volume by application of a trained generator function to input data, in particular via an arithmetic unit, wherein the input data is based on the input image data set and the result image parameter. Furthermore, in particular similarly via the arithmetic unit, a result classifier and a comparison classifier is determined by application of a trained classifier function to the result image data set and the comparison image data set. In particular, the result classifier is determined here by application of the trained classifier function to the result image data set, and the comparison classifier is determined by application of the trained classifier function to the comparison image data set.

The method also comprises an adjustment of a parameter of the trained generator function and/or a parameter of the trained classifier function based on the result classifier and the comparison classifier, in particular based on a comparison of the result classifier and of the comparison classifier. Furthermore, the trained generator function and/or the trained classifier function are provided, wherein provision can comprise, in particular, storing, transferring and/or displaying the trained generator function and/or the trained classifier function.

In the method for providing a trained generator function and/or a trained classifier function, the input image data set can also be referred to as the training input image data set, the result image data set can also be referred to as the training result image data set, and the comparison image data set can in particular also be referred to as the training comparison image data set. Furthermore, in this method the result image parameter can also be referred to as the training result image parameter.

An image classifier of an image data set comprises in particular a probability value and/or an image parameter of the image data set. The probability value corresponds here in particular to the probability that the image data set corresponds to a real image data set.

The result classifier is in particular an image classifier of the result image data set. The comparison classifier is in particular an image classifier of the comparison image data set.

The parameter is adjusted in particular by a GA algorithm. The parameter can be adjusted in particular by optimization of a cost function, for example by way of back propagation. The cost function can be based here, in particular, on the result classifier and the comparison classifier. In particular, the cost function can be based here on the probability value of the result classifier and the probability value of the comparison classifier, and/or the cost function can be based on a comparison of the image parameter of the result classifier and of the image parameter of the comparison classifier. The cost function can be based, in particular, on the probability value of the result classifier in that the cost function is based on a difference of the probability value of the result classifier from 0, and the cost function can be based, in particular, on the probability value of the comparison classifier in that the cost function is based on a difference of the probability value of the comparison classifier from 1.

The inventors have recognized that the described method can provide a trained generator function, which generates result image data sets, whose properties correspond to the respective comparison image data sets and have a similar overall impression.

Due to the fact that the result image parameter describes a property of the comparison image data set, and training occurs within a GA algorithm, by whose optimization result image data sets with similar or identical properties such as the comparison image data sets can be generated, the properties of the result image data set are also described by the result image parameter. As a result, with the described method, it is therefore possible to provide a trained generator function, which can generate the artificial result image data sets with predefined parameters.

The invention relates in a third embodiment to a provision system for providing a result image data set, comprising an interface and an arithmetic unit,
 wherein the interface is designed for receiving an input image data set of a first examination volume,
 wherein the interface and/or the arithmetic unit are designed for receiving or determining a result image parameter,
 wherein the arithmetic unit is also designed for determining a result image data set of the first examination volume by application of a trained generator function to input data, wherein the input data is based on the input image data set and the result image parameter, wherein the result image parameter relates to a property of the result image data set, and wherein a parameter of the trained generator function is based on a GA algorithm,
 and wherein the interface is also designed for providing the result image data set.

A provision system of this kind can be designed, in particular, to carry out the inventive method described above for providing a result image data set and its embodiments. The provision system is designed to carry out these methods and their embodiments in that the interface and the arithmetic unit are designed to carry out corresponding method steps.

The invention relates in a fourth embodiment to an X-ray device, comprising an X-ray source and an X-ray detector, further comprising a provision system as claimed in the third embodiment of the invention. An X-ray device can be, in particular, a C-arm X-ray device or a computer tomograph.

The invention relates in a possible fifth embodiment to a training system for providing a trained generator function and/or a trained classifier function, comprising a training interface and a training arithmetic unit,
 wherein the training interface is designed for receiving an input image data set and a comparison image data set of a first examination volume,
 wherein the training interface is also designed for receiving a result image parameter, wherein the result image parameter relates to a property of the comparison image data set,
 wherein the training arithmetic unit is designed for determining a result image data set of the first examination volume by application of a trained generator function to input data, wherein the input data is based on the input image data set and the result image parameter,
 wherein the training arithmetic unit is also designed for determining a result classifier and a comparison classifier by application of a trained classifier function to the result image data set and the comparison image data set,
 wherein the training arithmetic unit is also designed for adjusting a parameter of the trained generator function and/or the trained classifier function based on the result classifier and the comparison classifier,
 wherein the training interface is also designed for providing the trained generator function and/or the trained classifier function.

A training system can be designed, in particular, to carry out the above-described inventive method for providing a trained generator function and/or a trained classifier function. The training system is designed to carry out this method and its embodiments in that the training interface and the training arithmetic unit are designed to carry out the corresponding method steps.

The invention relates in a sixth embodiment to a computer program product having a computer program, which can be loaded directly into a memory of a provision system, with program segments in order to carry out all steps of the method for providing a result image data set and its embodiments when the program segments are run by the provision system; and/or which can be loaded directly into a training memory of a training system, with program segments in order to carry all steps of the method for providing a trained generator function and/or a trained classifier function and its embodiments when the program segments are run by the training system.

In particular, an embodiment of the invention relates to a computer program product having a computer program, which can be loaded directly into a memory of a provision system, with program segments in order to carry out all steps of the method for providing a result image data set and its embodiments when the program segments are run by the provision system.

In particular, an embodiment of the invention relates to a computer program product having a computer program, which can be loaded directly into a training memory of a training system, with program segments in order to carry out all steps of the method for providing a trained generator function and/or a trained classifier function and its embodiments when the program segments are run by the training system.

The invention relates in a seventh embodiment to a computer-readable storage medium on which program segments, which can be read and run by a provision system, are stored in order to carry out all steps of the method for providing a result image data set and its embodiments when the program segments are run by the provision system; and/or on which program segments, which can be read and run by a training system, are stored in order to carry out all steps of the method for providing a trained generator function and or a trained classifier function and its embodiments when the program segments are run by the training system.

In particular, an embodiment of the invention relates to a computer-readable storage medium on which program segments, which can be read and run by a provision system in order to carry out all steps of the method for providing a result image data set and its embodiments when the program segments are run by the provision system.

In particular, an embodiment of the invention relates to a computer-readable storage medium on which program segments, which can be read and run by a training system, are stored in order to carry out all steps of the method for providing a trained generator function and/or a trained classifier function and its embodiments when the program segments are run by the training system.

The invention relates in an eighth embodiment to a computer program or a computer-readable storage medium, comprising a trained generator function and/or a trained classifier function, provided by a method for providing a trained generator function and/or a trained classifier function.

An implementation largely in terms of software has the advantage that even previously used provision systems and training systems can be easily retrofitted by way of a software update in order to operate inventively. Apart from the computer program, a computer program product of this kind can optionally comprise additional components, such as, for example documentation and/or additional components, also hardware components, such as, for example hardware keys (dongles, etc.) for using the software.

FIG. 1 shows an examination volume VOL and various image data sets of the examination volume VOL. In the illustrated example embodiment, the examination volume VOL is an artificial examination volume, and the image data sets are simulations of an imaging of the artificial examination volume.

The illustrated image data sets of the examination volume VOL are characterized by two image parameters $p_1$, $p_2$. Here, the first image parameter $p_1$ relates to the X-ray dose used during imaging, and the second image parameter $p_2$ describes the X-ray device used during imaging (or the X-ray source XSYS.SRC used during imaging and the X-ray detector XSYS.DTC used during imaging).

Here, three different values are illustrated ($p_{1,1}$ "ultra-low dose", $p_{1,2}$ "low dose" and $p_{1,3}$ "medium dose") for the first image parameter $p_1$, and likewise three different values ($p_{2,1}$ "System A", $p_{2,2}$ "System B" and $p_{2,3}$ "System C") are illustrated for the second image parameter $p_2$. For each of the nine combinations of the first image parameter $p_1$ and of the second image parameter $p_2$, an image data set is illustrated, which is described by this combination of the first image parameter $p_1$ and of the second image parameter $p_2$.

For example, an input image data set ID is described by the parameter combination ($p_{1,1}$, $p_{2,1}$). If a trained image processing function or a doctor is matched to a different parameter combination, however, for example the parameter combination ($p_{1,3}$, $p_{2,2}$), then by way of an embodiment of the invention a result image data set OD can be generated which is described by this parameter combination.

Figure 2:
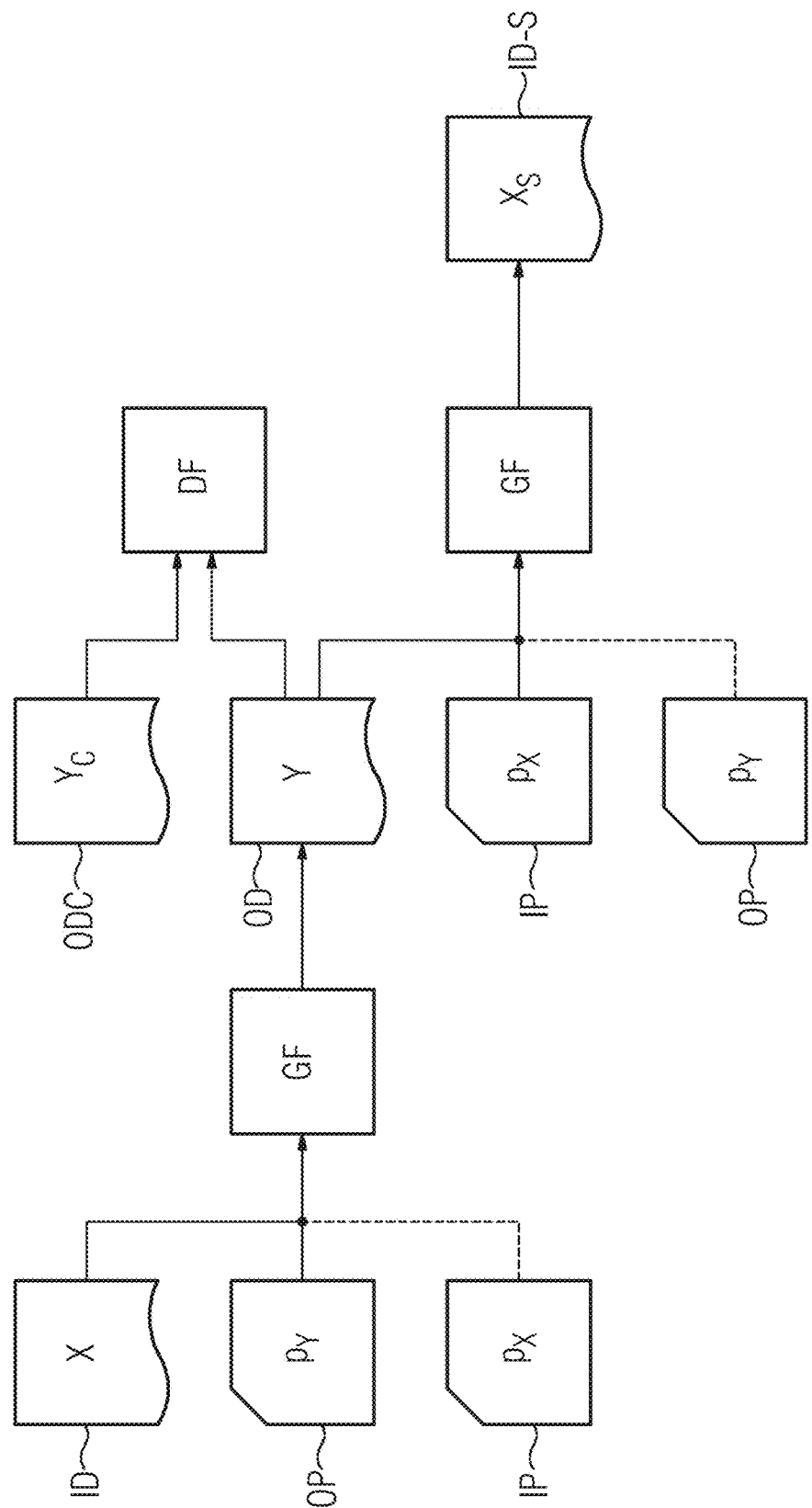
FIG. 2 shows a first data flowchart of the methods according to the invention and their embodiments.

FIG. 2 shows a first data flowchart of the methods according to the invention and their embodiments. The trained generator function GF is applied in this first data flowchart to two different input data. In the first case, the input data comprises the input image data set ID (designated by the formula letter X), the result image parameter OP (designated by the formula letter $p_Y$) and optionally the input image parameter IP (designated by the formula letter $p_X$). In this case, the result image data set OD (designated by the formula letter Y) is calculated as Y=G (X, $p_Y$, $p_X$) or as Y=G (X, $p_Y$). In the second case, the input data comprises the result image data set OD, the input image parameter IP and optionally the result image parameter OP. In this case a comparison input image data set ID-S (designated by the formula letter $X_s$) is calculated as $X_s$=G (Y, $p_X$, $p_Y$) or as $X_s$=G (Y, $p_X$, $p_Y$). Overall, the comparison input image data set ID-S therefore results as $X_s$=G (G (X, $p_Y$, $p_X$), $p_X$, $p_X$) or as $X_s$=G (G (X, $p_Y$), $p_X$). Both the result image data set OD and the comparison input image data set ID-S are, in particular, synthetic image data sets here.

The trained classifier function DF is applied in this first data flowchart likewise to two different input data. In the first case, the trained classifier function DF is applied to a comparison image data set OD-C (designated by the formula letter $Y_c$), and calculates a probability value $0 \leq q(Y_c) \leq 1$ and optionally a classifier $c(Y_c)$, which corresponds to an estimated value for the image parameter of the comparison image data set OD-C. The probability value $q(Y_c)$ corresponds here to the probability, estimated by the trained classifier function DF, that the input value is a real image data set. In the second case, the trained classifier function DF is applied to the result image data set OD and calculates a probability value $0 \leq q(Y) \leq 1$ and optionally a classifier c(Y). The following therefore applies DF(Y)=q(Y) or DF(Y)=(q(Y), c(Y)). The comparison image data set OD-C is, in particular, a real image data set here.

In this first data flowchart it should be noted that when providing the result image data set OD, only some of the first data flowchart is used, namely the determination of the result image data set OD as $Y=G(X, p_Y, p_X)$ or as $Y=G(X, p_Y)$. The other parts of the first data flowchart are used, in particular, only when training the generator function GF or when training the classifier function DF.

In the following, B designates the space of the image data sets, and P designates the space of the parameters. For example, for two-dimensional image data sets, the space of the image data sets can be $B=R^{m \cdot n}$ (where R designates the real numbers, and m or n the number of pixels or voxels for each of the dimensions), for three-dimensional image data sets the space of the image data sets can be $B=R^{i \cdot j \cdot k}$ (where i, j and k designates the number of pixels or voxels for each of the dimensions). If the image parameters correspond to a signal-to-noise ratio or an X-ray dose, the space of the image parameters can be, in particular $P=R^+$. If the image parameters correspond to an X-ray detector XSYS.DTC used, the space of the image parameters can be the quantity $M_D$ of all designations of X-ray detectors. If the image parameters comprise a signal-to-noise ratio and an X-ray detector XSYS.DTC used, the space of the image parameters can be, in particular, $P=R^+ \times M_D$.

The trained generator function GF is therefore a function GF: $B \times P \to B$ or GF: $B \times P^2 \to B$, and the trained classifier function DF is a function DF: $B \to [0, 1]$ or DF: $B \to [0, 1] \times P$.

Figure 3:
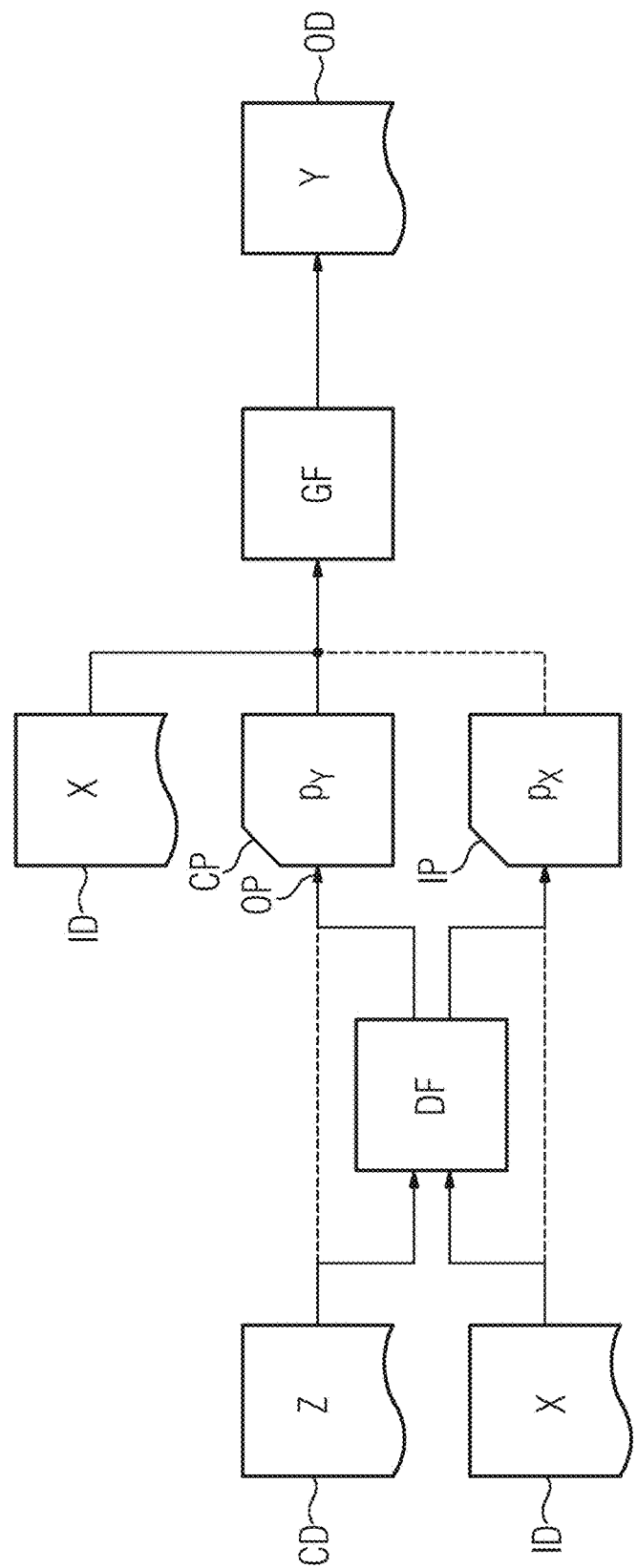
FIG. 3 shows a second data flowchart of the methods according to the invention and their embodiments.

FIG. 3 shows a second data flowchart of the method according to the invention and their embodiments. The second data flowchart comprises elements of the first data flowchart for determining the result image data set OD.

In contrast to the first data flowchart, the input image parameter IP and the result image parameter OP are determined mathematically. Here, the trained classifier function DF can be used, alternatively the input image parameter IP and the result image parameter OP can also be determined mathematically.

The input image parameter IP is determined here based on the input image data set ID, for example by $p_X=c(X)$, where $(q(X), c(X))=DF(X)$. The result image parameter OP is determined here based on a comparison image data set CD (which is described by the formula letter Z), for example by $p_Y=c(Z)$, where $(q(Z), c(Z))=DF(Z)$. In particular, in this case, determining and providing the result image data set (OD) occurs only if the result image parameter OP and the input image parameter IP differ from each other or if the difference exceeds a given threshold value.

Figure 4:
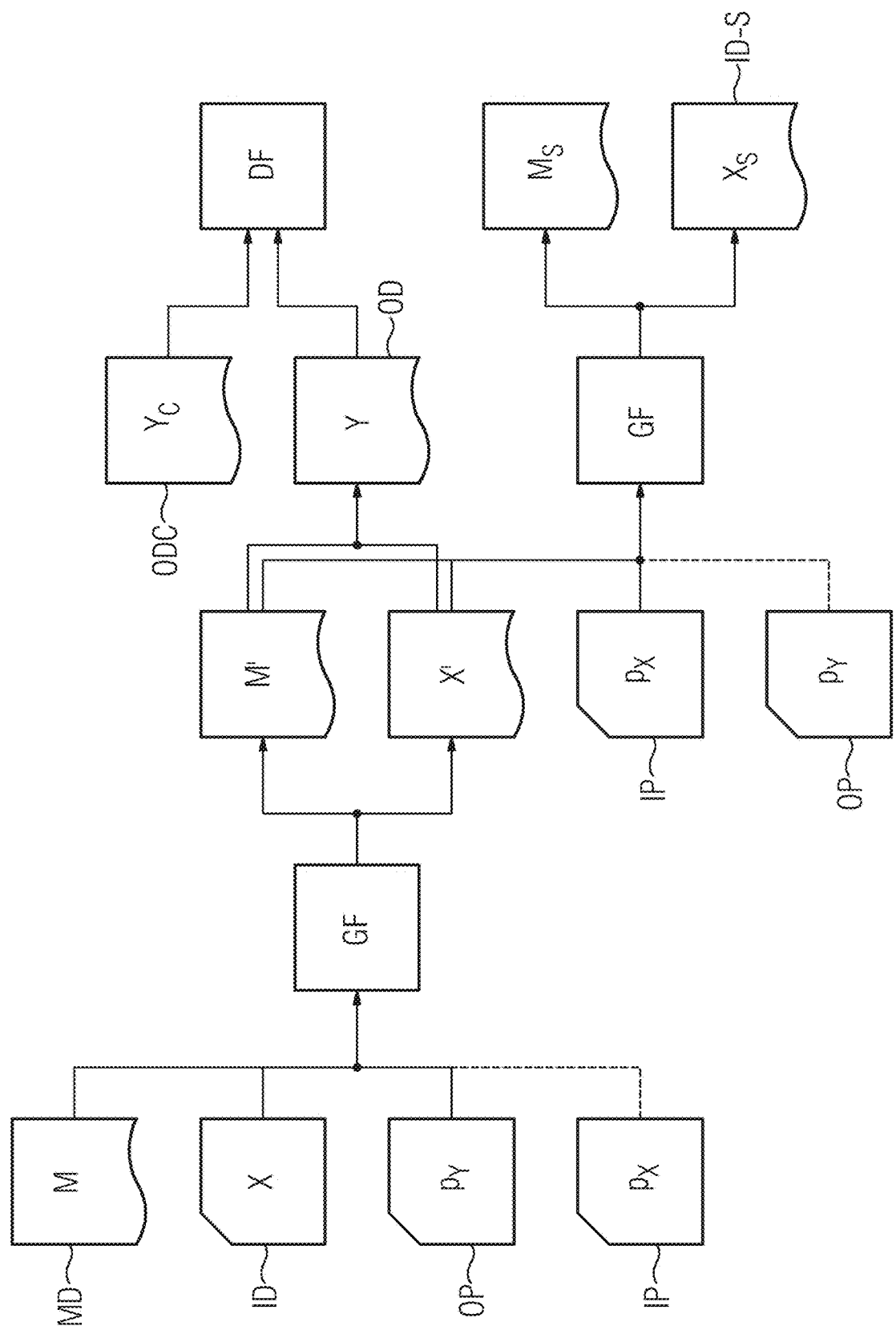
FIG. 4 shows a third data flowchart of the methods according to the invention and their embodiments.

FIG. 4 shows a third data flowchart of the methods according to the invention and their embodiments. The third data flowchart comprises elements of the first data flowchart.

In contrast to the first data flowchart, the trained generator function GF is here a function GF: $B^2 \times P \to B^2$ or GF: $B^2 \times P^2 \to B^2$. In particular, the trained generator function GF reproduces an input image data set ID, a mask image data set MD (described by the formula letter M), a result image parameter OP and optionally an input image parameter IP. Here, the input image data set ID is in particular a fill image data set. The input image data set ID and the mask image data set have the same dimensionality and the same spatial extent. The trained generator function GF generates here a modified mask image data set (designated by the formula letter M') and a modified fill image data set (designated by the formula letter X'), wherein at least the modified fill image data set is described by the result image parameter OP. $(X', M')=GF(X, M, p_Y, p_X)$ or $(X', M')=GF(X, M, p_Y, p_X)$ therefore applies. The result image data set OD, which in this case is a differential image data set, can then be calculated for example by $Y=X'-M'$.

In particular, the mask image data set MD and the input image data set ID (corresponding to a fill image data set) cannot be registered here; the modified mask image data set and the modified fill image data set can then be registered, however, by the application of the trained generator function GF.

In a second application, the generator function GF generates in the third data graph a comparison fill image data set (designated by the formula letter $X_s$) and a comparison mask image data set (designated by the formula letter $M_s$) as $(X_s, M_s)=GF(X', M', p_X, p_Y)=GF(GF(X, M, p_Y, p_X), p_X, p_Y)$ or $(X_s, M_s)=GF(X', M', p_X)=GF(GF(X, M, p_Y), p_X)$.

The third data flowchart can also comprise the additional elements of the second data flowchart.

Figure 5:
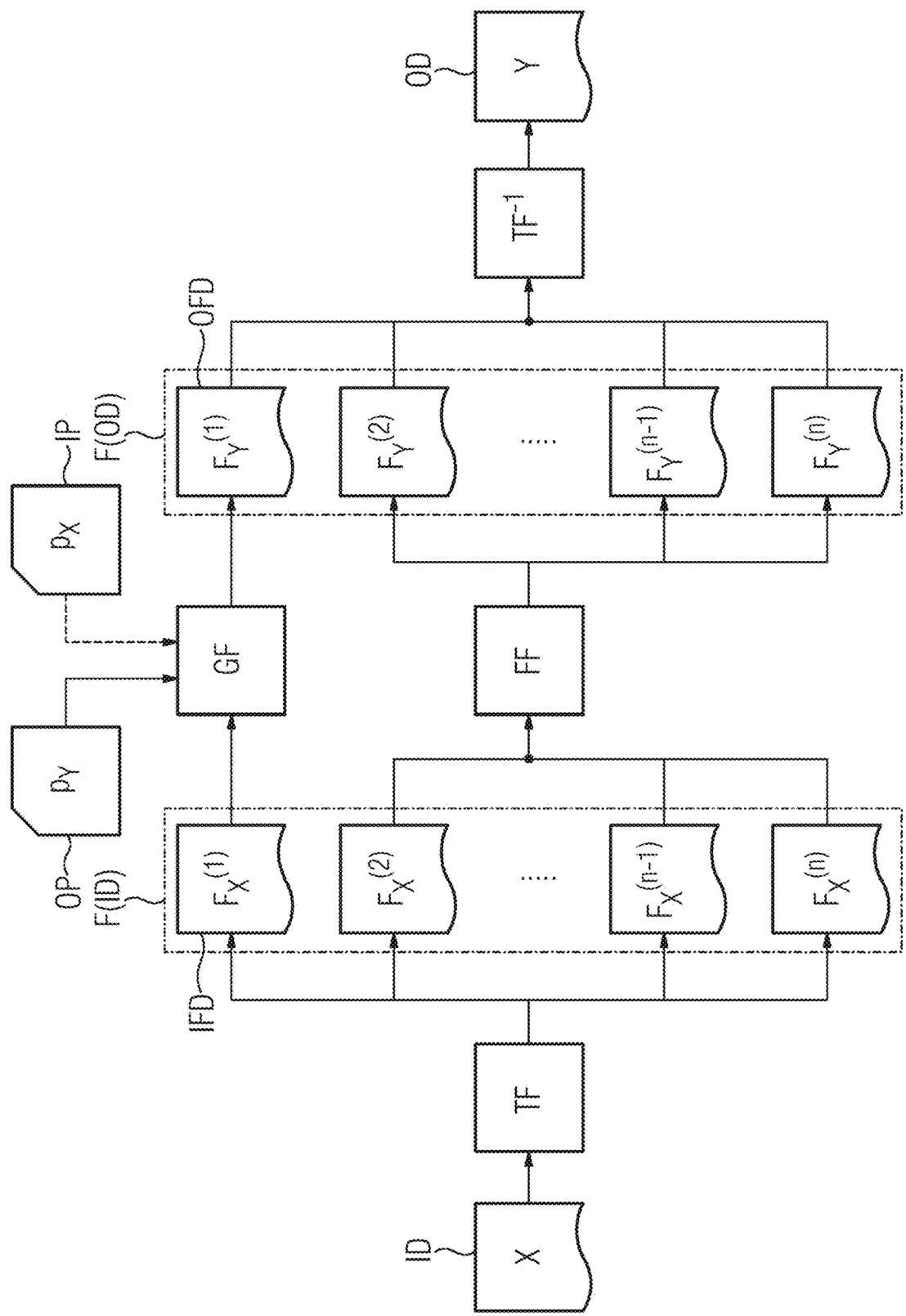
FIG. 5 shows a fourth data flowchart of the methods according to the invention and their embodiments.

FIG. 5 shows a fourth data flowchart of the methods according to the invention and their embodiments. In contrast to the first, the second and the third data flowcharts, in this fourth data flowchart the trained generator function GF is not directly applied to the input image data set ID but to an input frequency data set IFD. Here, the one frequency representation F(ID) of the input image data set ID is generated by a transform function TF (for example by a Fourier transform or by a wavelet decomposition). The frequency representation F(ID) of the output data set comprises a plurality of frequency components $F_X^{(1)}, \ldots, F_X^{(m)}$, with the plurality of frequency components being ordered in ascending order in accordance with the superscript index according to a frequency. In this example embodiment the input frequency data set IFD corresponds to the first frequency component $F_X^{(1)}$ in respect of the lowest frequency. The result frequency data set OFD is then determined by application of the trained generator function GF to the input frequency data set IFD, here by $F_Y^{(1)}=GF(F_X^{(1)}, p_Y, p_X)$ or $F_Y^{(1)}=GF(F_X^{(1)}, p_Y)$. The other frequency components of the frequency representation F(OD) of the result image data set OD can then be transformed here by a different frequency function FF, for example as $(F_Y^{(2)}, \ldots, F_Y^{(m)})=FF(F_X^{(2)}, \ldots, F_X^{(m)})$. The actual result image data set OD is then determined by application of the inverse transform function $TF^{-1}$. Overall, $Y=TF^{-1}(GF(F_X^{(1)}, p_Y, p_X), FF(F_X^{(2)}, \ldots, F_X^{(m)}))=TF^{-1}(GF(TF(X)^{(1)}, p_Y, p_X), FF(TF(X)^{(2)}, \ldots, TF(X)^{(m)}))$ or $Y=TF^{-1}(GF(F_X^{(1)}, p_Y), FF(F_X^{(2)}, \ldots, F_X^{(m)}))=TF^{-1}(GF(TF(X)^{(1)}, p_Y), FF(TF(X)^{(2)}, \ldots, TF(X)^{(m)}))$ applies therefore.

Figure 6:
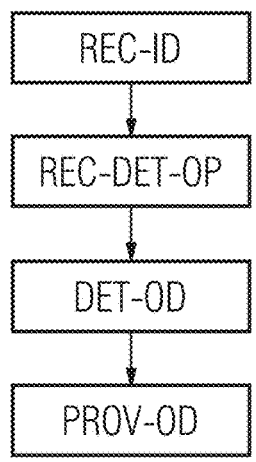
FIG. 6 shows a first example embodiment of the method for providing a result image data set.

FIG. 6 shows a first example embodiment of the method for providing a result image data set OD. The first example embodiment implements here, in particular, the first data flowchart illustrated in FIG. 2.

The first step of the illustrated first example embodiment is receiving REC-ID an input image data set ID of a first examination volume VOL via an interface IF. In particular, the input image data set ID can have been recorded previously via an X-ray device.

In this example embodiment, the input image data set ID is a two-dimensional image data set with the extent 512×512 pixels. In particular, the input image data set ID is in the DICOM format (Digital Imaging and Communications in Medicine). Alternatively, the input image data set ID can have a different dimensionality (in particular three-dimensional or four-dimensional), a different extent and/or a different format.

The next step of the illustrated first example embodiment is receiving or determining REC-DET-OP a result image parameter OP. In this example embodiment, the result image parameter OP is received via the interface IF.

In this example embodiment, the result image parameter OP comprises a signal-to-noise ratio and a model name of an X-ray detector XSYS.DTC. By way of the illustrated method a result image data set OD is therefore to be determined, which is described by the signal-to-noise ratio and is similar to an image, which was recorded via the specified X-ray detector XSYS.DTC. In other words, the result image parameter OP relates to the signal-to-noise ratio of the result image data set OD and an X-ray detector XSYS.DTC associated with the result image data set OD, in other words, properties of the result image data set OD.

The result image parameter OP is here, in particular, a pair comprising a number (corresponding to the signal-to-noise ratio) and a character string (corresponding to the type of X-ray detector XSYS.DTC), is therefore, in particular, a 2-tuple or a two-dimensional vector. In particular, a result image parameter OP, given by (3.0, "RD 1") can comprise the signal-to-noise ratio 3.0 and the model name "RD 1".

Alternatively, the result image parameter OP can also comprise just a signal-to-noise ratio. Alternatively, the result image parameter OP can also comprise just a model name of an X-ray detector XSYS.DTC. Alternatively, the result image parameter OP can also comprise an X-ray dose of the result image data set OD, a noise level of the result image data set OD, or an X-ray source XSYS.SRC corresponding to the result image data set OD, or a combination of these and/or other properties of the result image data set OD. In general, the result image parameter OP can therefore be represented by an n-tuple or by an n-dimensional vector, where, in particular, n=1 or n>1 is a possibility.

The next step of the first example embodiment is determining DET-OD a result image data set OD of the first examination volume VOL by application of a trained generator function GF to input data, with the input data being based on the input image data set ID and the result image parameter OP. Determining DET-OD the result image data set OD occurs here in particular via an arithmetic unit CU. Here, a parameter of the trained generator function GF is based on a GA algorithm.

In this first example embodiment the input data comprises the input image data set ID and the result image parameter OP, in particular the result image data set OD is generated by direct application of the trained generator function GF to the input image data set ID and the result image parameter OP. In particular, apart from the input image data set ID and the result image parameter OP, the input data does not comprise any further data. In particular, the result image data set OD can be determined by $Y=GF(X, p_y)$, with the notation introduced in FIG. 2 being used.

Alternatively, the input image data set ID can also be processed step-by-step. In this example embodiment, the input image data set ID, which is two-dimensional and has an extent of 512×512 pixels, can be divided here into 16 sections, which are each two-dimensional image data or image data sets with an extent of 128×128 pixels. Of course, other divisions into sections are also possible, for example into 64 sections of the extent 64×64 pixels. It is likewise possible for the different sections to overlap at the edges. A division into different sections is of course also possible with a three-dimensional input image data set ID and a four-dimensional input image data set ID.

If the processing occurs step-by-step, in particular, the trained generator function GF can be applied several times. In particular, the trained generator function GF can be applied exactly once to each of the sections respectively. Sections of the result image data set OD are generated here by the application of the trained generator function GF, for example as $Y_i=GF(X_i, p_y)$, where $X_i$ describes one of the sections of the input image data set ID, and where $Y_i$ describes the corresponding section of the result image data set OD. In particular, the method can in this case comprise an additional step, which relates to the combination or compiling of the result image data set OD based on the sections of the result image data set OD.

Furthermore, in this first example embodiment, a parameter of the trained generator function GF is based on a GA algorithm, in that the trained generator function GF was trained together with a trained classifier function DF. In particular, the trained generator function GF is the result of an inventive method for providing a trained generator function GF and/or a trained classifier function DF.

The trained generator function GF is here, in particular, a neural network, in particular a convolutional neural network or a network comprising a convolutional layer. The trained classifier function DF is here, in particular, also a neural network, in particular a convolutional neural network or a network comprising a convolutional layer.

The last step of the illustrated example embodiment is providing PROV-OD the result image data set OD. In this first example embodiment, the result image data set OD is transferred via the interface to a unit making a request. Alternatively, the result image data set OD can also be displayed or stored.

Figure 7:
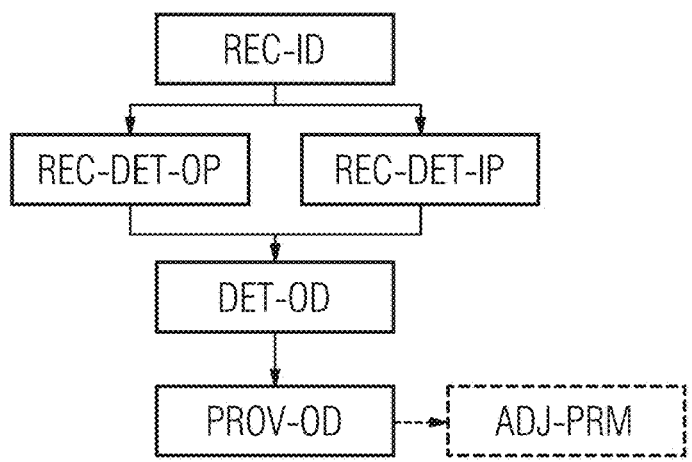
FIG. 7 shows a second example embodiment of the method for providing a result image data set.

FIG. 7 shows a second example embodiment of the method for providing a result image data set OD. The second example embodiment also implements the first data flowchart shown in FIG. 2.

In addition to the steps already described in respect of FIG. 6 and the first example embodiment (which, in particular, can comprise all advantageous designs and developments described there), the second example embodiment also comprises determining and/or receiving an input image parameter IP. This additional step can be carried out, in particular, via the arithmetic unit CU and/or the interface IF.

The input image parameter IP describes here a property of the input image data set ID. In particular, the input image parameter IP and the result parameter OP have the same structure, in other words, the input image parameter IP describes the same properties of an image data set (in respect of the input image data set ID) as the result image parameter OP (in respect of the result image data set OD) describes.

In particular, in this second example embodiment, the input image parameter IP comprises a signal-to-noise ratio of the input image data set ID and the X-ray detector XSYS.DTC type, by which the input image data set ID was recorded. In particular, the signal-to-noise ratio of the input image parameter IP differs from the signal-to-noise ratio of the result image parameter OP, and/or the X-ray detector XSYS.DTC type of the input image parameter IP differs from the X-ray detector XSYS.DTC type of the result image parameter OP.

In this second example embodiment, the input image parameter IP is received via the interface IF. Alternatively, the input image parameter IP can be determined on the basis of the input image data set ID. This can occur, in particular, by the application of a trained classifier function DF to the input image data set ID. Alternatively, different ways of determining the input image parameter IP are possible, for example the input image parameter IP can be determined on the basis of the metadata of the input image data set ID.

In particular, a parameter of the trained classifier function DF is based here on the GA algorithm on which the parameter of the trained generator function GF is also based. In particular, the trained classifier function DF and the trained generator function GF were trained jointly. In particular, the trained classifier function DF was provided by way of an embodiment of an inventive method for providing a trained generator function GF and/or a trained classifier function DF.

The second example embodiment comprises as an optional step the adjustment ADJ-PRM of an imaging parameter of an imaging unit XSYS based on the comparison of the input image parameter IP and the comparison image parameter CP. In this example the X-ray dose of the X-ray device is increased or reduced if the difference between the signal-to-noise ratio of the input image parameter IP and the signal-to-noise ratio of the comparison image parameter CP exceeds a predefined value. In particular, the X-ray dose of the X-ray device XSYS can be increased if the signal-to-noise ratio of the input image parameter IP is smaller than the signal-to-noise ratio of the comparison image parameter CP, and if the difference or value of the difference exceeds the predefined value. In particular, the X-ray dose of the X-ray device XSYS can be reduced if the signal-to-noise ratio of the input image parameter IP is greater than the signal-to-noise ratio of the comparison image parameter CP, and if the difference or the value of the difference exceeds the predefined value.

Figure 8:
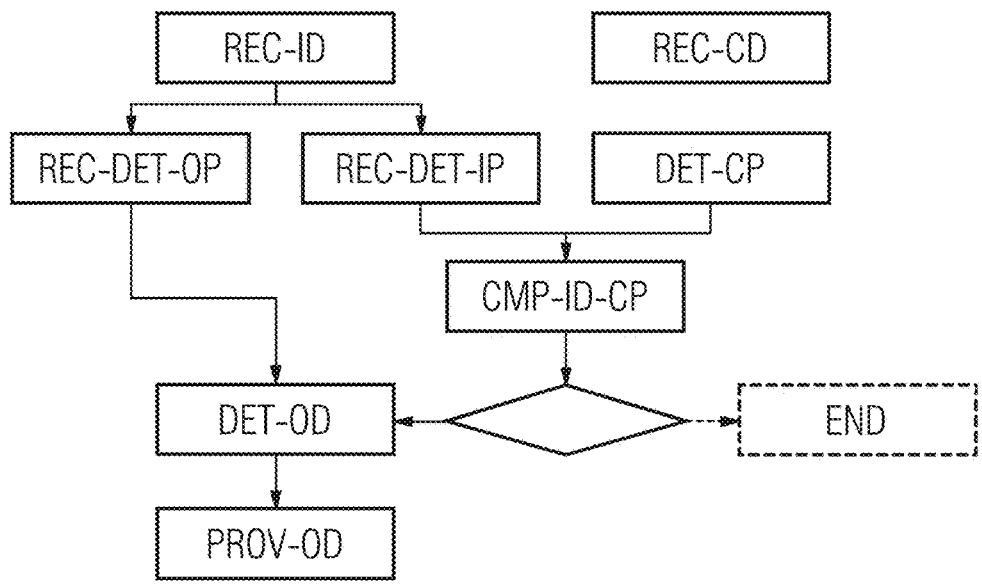
FIG. 8 shows a third example embodiment of the method for providing a result image data set.

FIG. 8 shows a third example embodiment of the method for providing a result image data set OD. The third example embodiment implements the second data flowchart shown in FIG. 3.

The third example embodiment comprises the steps described in respect of FIG. 6 and FIG. 7 or in respect of the first and of the second example embodiment, which, in particular, can comprise all advantageous designs and developments described there.

The third example embodiment also comprises receiving REC-CD a comparison image data set OD-C of a second examination volume, with the first examination volume VOL and the second examination volume overlapping and/or being identical. Receiving REC-CD of the comparison image data set OD-C occurs, in particular, via the interface IF.

The comparison image data set OD-C can, in particular, have the same dimensionality as the input image data set ID. Furthermore, the comparison image data set OD-C can, in particular in respect of each of the dimensions, have the same extent, measured in voxels or pixels, as the input image data set ID. It is also possible, however, that the input image data set ID and the comparison image data set OD-C have different extents.

In this example embodiment, the comparison image data set OD-C is likewise a two-dimensional image data set with the extent 512×512 pixels. Furthermore, in this example embodiment, the first examination volume VOL and the second examination volume are identical.

A further step of the third example embodiment is determining DET-CP a comparison image parameter CP by application of the trained classifier function DF to the comparison image data set OD-C, with the comparison image parameter CP relating to a property of the comparison image data set OD-C, and with a parameter of the trained classifier function DF being based on the GA algorithm. Determining DET-CP the comparison image parameter OD-C occurs here, in particular, via the arithmetic unit CU.

A further step of the third example embodiment is the comparison CMP-IP-CP of the input image parameter IP and of the comparison image parameter CP, in particular via the arithmetic unit CU.

In this example embodiment, determining DET-OD the result image data set OD is only carried out if the comparison image parameter CP differs from the input image parameter IP. In particular, a difference can exist if a difference of the comparison image parameter CP and of the input image parameter IP is above a predefined threshold value. If the comparison image parameter CP does not differ from the input image parameter IP, the method ends END without determining DET-OD the result image data set OD. When determining DET-OD the result image data set OD, the result image parameter OP is chosen or defined such that the result image parameter OP corresponds to the comparison image parameter CP.

Figure 9:
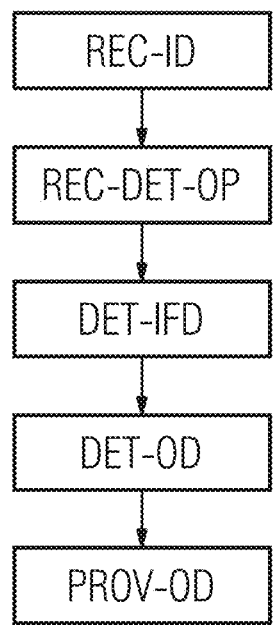
FIG. 9 shows a fourth example embodiment of the method for providing a result image data set.

FIG. 9 shows a fourth example embodiment of the method for providing a result image data set OD. The third example embodiment implements the fourth data flowchart illustrated in FIG. 5.

The third example embodiment comprises the steps described in respect of FIG. 6 and FIG. 7 or in respect of the first and the second example embodiment, which, in particular, can comprise all advantageous designs and developments described there.

The fourth example embodiment also comprises determining DET-IFD an input frequency data set IFD based on the input image data set ID. Here, the input frequency data set IFD is a representation of the input image data set ID in the frequency space (in particular a component of the representation of the input image data set ID in the frequency space), in this example embodiment the input frequency image data set IFD is a component of the wavelet decomposition TF of the input image data set ID, alternatively, a Fourier transform or a Laplace transform, for example, can also be used.

Applying the wavelet decomposition TF to the input image data set ID generates a frequency representation F(ID) of the input image data set ID. The frequency representation F(ID) of the input image data set ID comprises a plurality of frequency components $F_X^{(1)}, \ldots, F_X^{(n)}$, with the plurality of frequency components being ordered in ascending order according to a frequency in accordance with the superscript index. In this example embodiment the input frequency data set IFD corresponds to the first frequency component $F_X^{(1)}$ in respect of the lowest frequency.

In this example embodiment the input data is also based on the input frequency data set IFD. Application of the trained generator function GF to the input data generates a result frequency data set OFD, with the result frequency data set OFD being a representation of the result image data set OD (in particular a component of the representation of the result image data set OD in the frequency space) in the frequency space.

The other frequency components of the frequency representation F(OD) of the result image data set OD can then be determined here by a different frequency function FF based on the other frequency components of the frequency representation F(ID) of the input image data set ID. The input image data set ID can then be determined by an inverse wavelet decomposition TF−1 of the frequency representation F(OD) of the result image data set.

Figure 10:
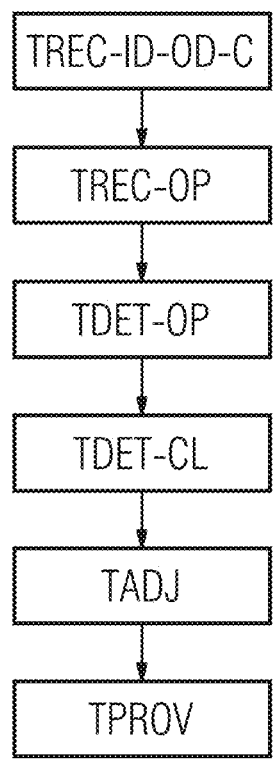
FIG. 10 shows an example embodiment of a method for providing a trained generator function and/or a trained classifier function.

FIG. 10 shows an example embodiment of a method for providing a trained generator function GF and/or a trained classifier function DF.

The first step of the illustrated example embodiment is receiving TREC-ID-OD-C an input image data set ID and a comparison image data set OD-C of a first examination volume VOL. Receiving TREC-ID-OD-C is carried out in particular via a training interface TIF. In the illustrated example embodiment, both the comparison image data set OD-C and the input image data set ID are two-dimensional image data sets, wherein the extent, measured in pixels, of the input image data set ID in respect of each dimension matches the extent, measured in pixels, of the comparison image data set OD-C. Alternatively, the comparison image data set OD-C and the input image data set ID can be three-dimensional or four-dimensional image data sets, also alternatively, the extent of the comparison image data set OD-C and of the input image data set ID can also differ.

The comparison image data set OD-C is designated hereinafter also by the formula letter Yc, the input image data set ID is designated by the formula letter X.

A further step of the illustrated example embodiment is receiving TREC-OP a result image parameter OP, with the result image parameter OP relating to a property of the comparison image data set OD-C. Receiving TREC-OP the result image parameter OP is carried out in particular via the training interface TIF. In this example embodiment the result image parameter OP relates to the signal-to-noise ratio of the comparison image data set OD-C and the X-ray detector XSYS.DTC used during recording of the comparison image data set OD-C. The result image parameter OP is designated hereinafter by the formula letter $p_Y$.

A further step of the illustrated example embodiment is determining TDET-OD a result image data set OD of the first examination volume VOL by application of a trained generator function GF to input data, with the input data being based on the input image data set ID and the result image parameter OP. Determining TDET-OD of the result image data set OD is carried out, in particular, via a training arithmetic unit TCU.

In the illustrated example embodiment, the result image data set OD is also a two-dimensional image data set. The extent, measured in pixels, of the result image data set OD is identical in respect of each dimension to the extent, measured in pixels, of the input image data set ID. If the input image data set ID is alternatively a three-dimensional image data set, the result image data set OD is, in particular, also a three-dimensional image data set. If the input image data set ID is alternatively a four-dimensional image data set, the result image data set OD is, in particular, also a four-dimensional image data set.

The result image data set OD (hereinafter also described by the formula letter Y) is calculated in this example embodiment as $Y=GF(X, p_y)$. Alternatively, in the method, an input image parameter IP (designated by the formula letter $p_x$) can also be received or determined, with the input image parameter IP relating to a property of the input image data set ID. In this case, the result image data set OD can be determined by $Y=GF(X, p_y, p_x)$.

A further step of the illustrated example embodiment is determining TDET-CL a result classifier and a comparison classifier by application of a trained classifier function DF to the result image data set OD and the comparison image data set OD-C, in particular via the training arithmetic unit TCU. Furthermore, the result classifier is described by the formula letter c(Y) and the comparison classifier by the formula letter $c(Y_c)$.

In the illustrated example embodiment, the trained classifier function DF is a function DF: $B \rightarrow [0, 1] \times P$. The result classifier is given, in particular, by $(q(Y), c(Y))=DF(Y)$, with q(Y) being the probability, determined by the trained classifier function DF, that the result image data set OD is a real image data set. The comparison classifier is given, in particular, by $(q(Y_c), c(Y_c))=DF(Y_c)$, with $q(Y_c)$ being the probability, determined by the trained classifier function DF, that the comparison image data set OD-C is a real image data set.

A further step of the illustrated example embodiment is the adjustment TADJ of a parameter of the trained generator function GF and/or the trained classifier function DF based on a comparison of the result classifier and of the comparison classifier, in particular via the training arithmetic unit TCU.

Hereinafter, possible cost functions $K^{(GF)}$ of the trained generator function GF and possible cost functions $K^{(DF)}$ of the trained classifier function DF are described in each case. However, it is of course possible at any time to use different cost functions. Here, the cost functions are described in the context either of the trained generator function GF or trained classifier function DF. However, this should be understood such that elements of the cost functions can be used in each case also for the other trained function. The individual components of the cost functions $K^{(GF)}$, $K^{(DF)}$ can, in particular, be weighted differently by specified weights.

If the trained classifier function DF is a function DF: $B \rightarrow [0, 1]$, the cost function $K^{(DF)}$ of the trained classifier function DF can comprise, for example, an adversarial cost function $K^{(DF)}_A=-BCE(DF(Y_c), 1)-BCE(DF(Y), 0)=-BCE(q(Y_c), 1)-BCE(q(Y), 0)$, where BCE is the binary cross-entropy designated by $BCE(z, z')=z' \log(z)+(1-z')\log(1-z)$. In particular, the adversarial cost function is therefore given by $K^{(DF)}_A=-\log(DF(Y_c))-\log(1-DF(Y))=-\log(q(Y_c))-\log(1-q(Y))=\log(q(Y_c))-\log(1-q(GF(X, p_y)))$. With a minimization of this cost function, the trained classifier function DF is designed to distinguish as optimally as possible between real image data (corresponding to the comparison image data sets OD-C) and synthetic image data, generated by the trained generator function GF (corresponding to the result image data sets OD).

For the cost function $K^{(GF)}$ of the trained generator function GF, in particular, an adversarial cost function $K^{(GF)}_A=-BCE(DF(Y), 1)=-\log(q(Y))=-\log(q(GF(X, p_y)))$ can likewise be used. With a minimization of this cost function, the trained generator function GF is designed to generate result image data sets OD which are erroneously classified by the trained classifier function DF as real image data.

If the trained classifier function DF is a function DF: $B \rightarrow [0, 1] \times P$, then, in addition to the adversarial cost function $K^{(DF)}_A$ already defined, the cost function $K^{(DF)}$ can have a further fraction (classification cost function $K_P$), which quantifies differences in the image parameters. For example, it is possible to use a classification cost function $K_P$, where $K_P=|c(Y)-c(Y_c)|_n=|c(GF(X, p_y))-c(Y_c)|_n$ or $K_P=|c(Y)-p_y|_n=|c(GF(X, p_y))-p_y|_n$, where $|A|_n$ designates the n-standard of A, in particular a 1-standard or a 2-standard. The classification cost function $K_P$ can, in particular, also be used in the cost function $K^{(GF)}$ of the trained generator function GF. Here, in particular in the case in which an image parameter can be measured directly on the basis of an image data set, the classifier c(Y) can either be determined by application of the trained classifier function DF or by direct calculation.

If the result image parameter OP is one element from a set (for example the X-ray detector XSYS.DTC used), then $p_Y$ can be defined as a unit vector whose dimension corresponds to the cardinality, and which can only assume elements 0 and 1. In this case c(Y) and $c(Y_c)$ are then also vectors of the same dimension, either the same form as $p_Y$ or with inputs between 0 and 1, which each correspond to a probability. A standard $|c(Y)-c(Y_c)|_n$ can in this case be understood as the sum of the standards of the individual components. This also applies if the result image parameter OP is an object with a higher dimension. Also in this case, a standard $|c(Y)-c(Y_c)|_n$ can be understood as a sum of the standards of the individual dimensions.

The cost function $K^{(GF)}$ of the trained generator function GF can also comprise a cyclical consistency cost function $K_{CC}$ and an information loss cost function $K_{IL}$. The value $K_{CC}$ of the cyclical consistency cost function is given by $K_{CC}=|X-X_c|_m=|X-GF(GF(X), p_y) p_x)|_m$, or $K_{CC}=|X-GF(GF(X), p_y, p_x) p_x, p_y)|_m$, where $|A|_m$ designates the m-standard of A. In particular, m=1 and m=2 can be chosen. Since X and $X_c$ are image data sets, the standard can in each case be calculated pixel-by-pixel or voxel-by-voxel. A minimization of the cyclical consistency cost function results in the two-time application of the trained generator function GF with interchanged image parameters being as similar as possible to an identity image (and thereby acting like an autoencoder), and therefore the generation of image data with different parameters is affected by few errors.

The share $K_{IL}$ of the information loss cost function is calculated as $$K_{IL}=\Sigma_{i \in \pi}\Sigma_{s(i) \in \sigma(i)} |\langle GF(X,p_y)-X\rangle_{s(i)}|_l$$

where π designates the quantity of pixels or voxels of X or $GF(X, p_y)$, where σ(i) designates a quantity of environments of the pixel i (for example the 3×3 environment, the 5×5 environment and the 7×7 environment in the two-dimensional case, or the 3×3×3 environment, the 5×5×5 environment and the 7×7×7 environment in the three-dimensional case), and $\langle GF(X, p_y)-X\rangle_{s(i)}$ designates the mean of the difference $GF(X, p_y)-X$ in the environment s(i) of the pixel i. Furthermore, $|A|_l$ designates the l-standard of A, where, in particular, m=1 and m=2 can be chosen. The use of an information loss cost function is particularly advantageous if the image noise is not independent of the image signal, and if, at the same time, the input image data set ID is divided into a plurality of subsections, and the trained generator function GF is applied to each of these subsections, and the result image data set OD is composed of the results of the application to the subsections ("patch-by-patch processing"). In this case the information loss cost function of the trained generator function GF allows the signal-dependent fraction of the image noise to be better understood and felt.

The entire cost function $K^{(GF)}$ to be minimized of the trained generator function GF can therefore be given by $K^{(GF)}=\mu^{(GF)}_A \cdot K^{(GF)}_A+\mu^{(GF)}_P \cdot K_P+\mu_{CC} \cdot K_{CC}+\mu_{IL} \cdot K_{IL}$, where μ is in each case a weighting factor (which can also be 0 in each case). The entire cost function $K^{(DF)}$ to be minimized of the trained classifier function DF can therefore be given by $K^{(DF)}=\mu^{(DF)}_A \cdot K^{(DF)}_A+\mu^{(DF)}_P \cdot K_P$, where μ is in each case a weighting factor (which can also be 0 in each case). The parameters of the trained generator function GF and the trained classifier function DF can be adjusted, for example, in a manner known to a person skilled in the art by back propagation. Of course other methods of minimization can be applied. If the trained generator function GF and the trained classifier function DF are neural networks, the respective cost function can, in particular, occur by adjustment of parameters of the trained generator function GF and/or the trained classifier function DF.

The last step of the illustrated example embodiment is providing TPROV the trained generator function GF and/or the trained classifier function DF. Here, in this example embodiment both the trained generator function GF and the trained classifier function DF are stored. Alternatively or in addition, the trained generator function GF and the trained classifier function DF can also be transferred to a receiver.

Figure 11:
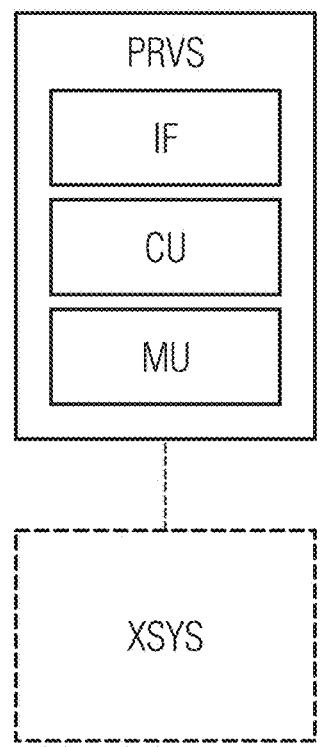
FIG. 11 shows a provision system.
Figure 12:
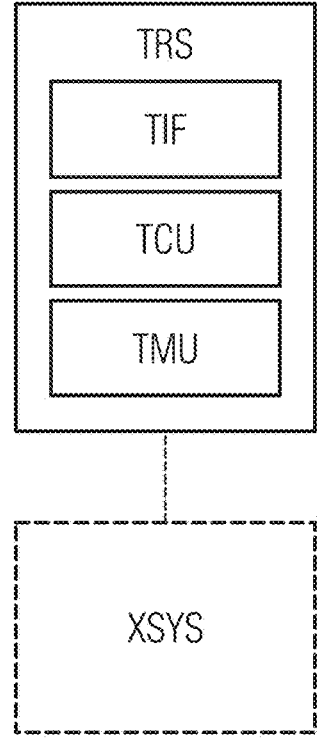
FIG. 12 shows a training system.

FIG. 11 shows a provision system PRVS, FIG. 12 shows a training system TRS. The illustrated provision system PRVS is designed to carry out an inventive method for providing a result image data set OD. The illustrated training system TRS is designed to carry out an inventive method for providing a trained generator function GF and/or a trained classifier function DF. The provision system PRVS comprises an interface IF, an arithmetic unit CU and a memory unit MU; the training system TRS comprises a training interface TIF, a training arithmetic unit TCU and a training memory unit TMU.

The provision system PRVS and/or the training system TRS can be, in particular, a computer, a microcontroller or an integrated circuit. Alternatively, the provision system PRVS and/or the training system TRS can be a real cluster or Cloud. The provision system PRVS and/or the training system TRS can also be designed as a virtual system, which is run on a real computer or a real cluster or Cloud of computers (virtualization).

An interface IF and/or a training interface TIF can be a hardware or software interface (for example PCI-Bus, USB or Firewire). An arithmetic unit CU and/or a training arithmetic unit TCU can have hardware elements or software elements, for example a microprocessor or what is referred to as an FPGA (Field Programmable Gate Array). A memory unit MU and/or a training memory unit TMU can be implemented as a non-permanent main memory (Random Access Memory, RAM for short) or as a permanent mass storage device (hard disk, USB stick, SD card, Solid State Disk).

The interface IF and/or the training interface TIF can comprise, in particular, a plurality of sub-interfaces which carry out different steps of the respective methods. In other words, the interface IF and/or the training interface TIF can also be understood as a large number of interfaces IF or large number of training interfaces TIF. The arithmetic unit CU and/or the training arithmetic unit TCU can comprise, in particular, a plurality of sub-arithmetic units, which carry out different steps of the respective methods. In other words, the arithmetic unit CU and/or the training arithmetic unit TCU can also be understood as a large number of arithmetic units CU or a large number of training arithmetic units TCU.

Figure 13:
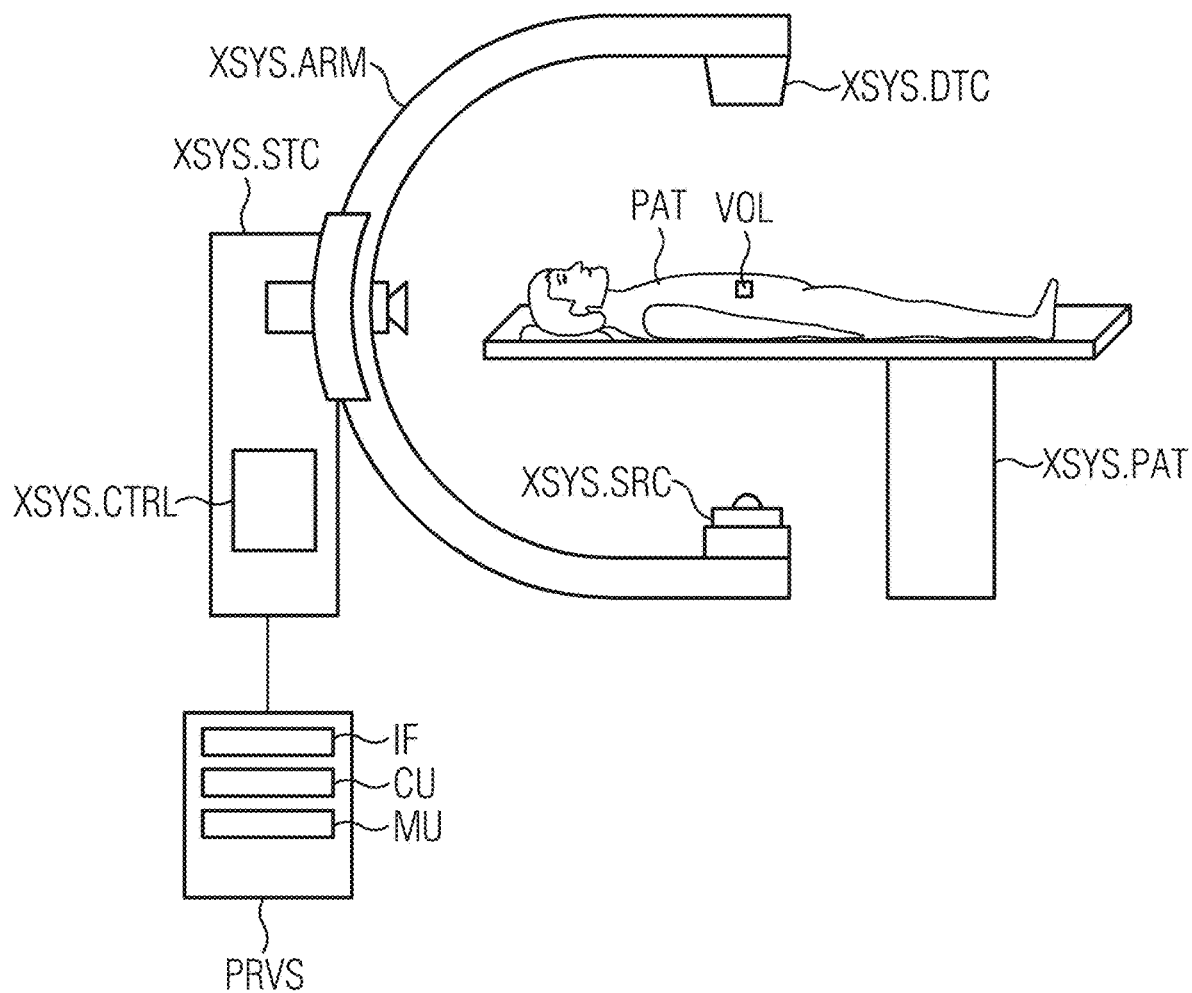
FIG. 13 shows an X-ray device.

FIG. 13 shows an X-ray device XSYS connected to a provision system PRVS. In the example embodiment shown, the X-ray device XSYS is a C-arm X-ray device XSYS. The C-arm X-ray device XSYS comprises an X-ray source XSYS.SRC for emitting X-rays. Furthermore, the C-arm X-ray device XSYS comprises an X-ray detector XSYS.DTC for receiving X-rays. The X-ray source XSYS.SRC and the X-ray detector XSYS.DTC are fastened to the two different ends of the C-arm XSYS.ARM. The C-arm XSYS.ARM of the C-arm X-ray device XSYS is fastened to a stand XSYS.STC. The stand XSYS.STC comprises drive elements, which are configured to change the position of the C-arm XSYS.ARM. In particular, the C-arm XSYS.ARM can be rotated about two different axes. The C-arm X-ray device also comprises a control and evaluation XSYS.CTRL and a patient-positioning device XSYS.PAT on which a patient PAT can be positioned. The position of the C-arm XSYS.ARM can be set, the C-arm XSYS.ARM can be rotated about the examination volume VOL and X-ray image data sets of the examination volume VOL can be taken via the control and evaluation unit XSYS.CTRL. As an alternative to the illustrated example embodiment, it is also possible that the provision system PRVS is designed as part of the control and evaluation unit XSYS.CTRL.

Where this has not explicitly occurred but is expedient and within the meaning of the invention, individual example embodiments, individual partial embodiments or features thereof can be combined with each other or interchanged without departing from the scope of the current invention. Advantages of the invention described in relation to one example embodiment also apply, without being explicitly mentioned and where transferable, to other example embodiments.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for providing a result image data set, the computer-implemented method comprising:
   receiving an input image data set of a first examination volume;
   receiving or determining a result image parameter;
   receiving or determining an input image parameter;
   determining a result image data set of the first examination volume by application of a trained generator function to input data, a parameter of the trained generator function being based on a Generative Adversarial (GA) algorithm, the input data being based on the input image data set,
      the result image parameter, and the result image parameter relates to one or more properties of the result image data set, the one or more properties including
         an X-ray dose of the result image data set,
         noise level of the result image data set, and
         at least one of an X-ray source or an X-ray detector corresponding to the result image data set, and
   the input image parameter, the input image parameter relating to a property of the input image data set,
   wherein the input image data set is an X-ray image data set of the first examination volume; and
   providing the result image data set.

2. The method of claim 1, further comprising:
   receiving a comparison image data set of a second examination volume, the first examination volume and the second examination volume being at least one of overlapping or identical;
   determining a comparison image parameter by application of a trained classifier function to the comparison image data set, the comparison image parameter relating to a property of the comparison image data set, a parameter of the trained classifier function being based on the GA algorithm; and
   comparing the input image parameter and the comparison image parameter, the result image data set being determined upon the comparison image parameter differing from the input image parameter, and the result image parameter matching the comparison image parameter.

3. The method of claim 2, further comprising:
   adapting an imaging parameter of an imaging unit based on the comparing of the input image parameter and the comparison image parameter.

4. The method of claim 1, further comprising:
   determining an input frequency data set based on the input image data set, the input frequency data set being a representation of the input image data set in a frequency space,
   wherein the input data is based on the input frequency data set,
   wherein the application of the trained generator function to the input data generates a result frequency data set, and
   wherein the result frequency data set is a representation of the result image data set in the frequency space.

5. The method of claim 1, wherein the result image parameter is matched to a trained image processing function.

6. The method of claim 1, further comprising:
   receiving a mask image data set of a third examination volume, the first examination volume and the third examination volume being at least one of overlapping or identical, and the input data being based on the mask image data set.

7. The method of claim 1, wherein the parameter of the trained generator function is based on at least one of a cyclical consistency cost function or an information loss-cost function.

8. The method of claim 1, wherein
   the input image data set includes a time sequence of input image data of the first examination volume, and
   the result image data set includes a time sequence of result image data of the first examination volume.

9. A provision system for providing a result image data set, the provision system comprising:
   an interface configured to receive an input image data set of a first examination volume, and to provide a result image data set of the first examination volume; and
   an arithmetic unit, at least one of the interface or the arithmetic unit being configured to receive or determine a result image parameter, and the arithmetic unit being configured to determine the result image data set of the first examination volume by application of a trained generator function to input data, a parameter of the trained generator function being based on a Generative Adversarial (GA) algorithm, the input data being based on the input image data set, the result image parameter, and the result image parameter relates to one or more properties of the result image data set, the one or more properties including an X-ray dose of the result image data set, noise level of the result image data set, and at least one of an X-ray source or an X-ray detector corresponding to the result image data set, and an input image parameter, the input image parameter relating to a property of the input image data set, the input data being based on the input image parameter, wherein the input image data set is an X-ray image data set of the first examination volume.

10. An X-ray device, comprising:

an X-ray source;

an X-ray detector; and the provision system of claim 9.

11. A non-transitory computer program product storing a computer program, which is directly loadable into a memory of a provision system, the computer program including program segments to carry out the method of claim 1 when the program segments are run by the provision system.

12. A non-transitory computer-readable storage medium storing program segments, which readable and executable by a provision system to carry out the method of claim 1 when the program segments are executed by the provision system.

* * * * *